(12) United States Patent
Murakami

(10) Patent No.: US 11,712,940 B2
(45) Date of Patent: Aug. 1, 2023

(54) SUSPENSION DEVICE AND RECORDING MEDIUM

(71) Applicant: SHOWA CORPORATION, Gyoda (JP)

(72) Inventor: Yosuke Murakami, Fukuroi (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 605 days.

(21) Appl. No.: 16/782,724

(22) Filed: Feb. 5, 2020

(65) Prior Publication Data
US 2020/0171909 A1 Jun. 4, 2020

Related U.S. Application Data

(63) Continuation of application No. PCT/JP2017/039373, filed on Oct. 31, 2017.

(30) Foreign Application Priority Data

Oct. 19, 2017 (JP) .................. 2017-202899

(51) Int. Cl.
*B60G 17/08* (2006.01)
*F16F 9/48* (2006.01)
(Continued)

(52) U.S. Cl.
CPC ............... *B60G 17/08* (2013.01); *F16F 9/48* (2013.01); *F16F 9/512* (2013.01); *F16F 9/516* (2013.01);
(Continued)

(58) Field of Classification Search
CPC ............... B60G 17/08; B60G 2202/24; B60G 2300/12; B60G 2400/10; B60G 2400/25;
(Continued)

(56) References Cited

U.S. PATENT DOCUMENTS 5,174,598 A * 12/1992 Sato ................. B60G 17/018
180/41
5,289,380 A * 2/1994 Kimura ............ B60G 17/018
280/5.515
(Continued)

FOREIGN PATENT DOCUMENTS

DE 102009046055 A1 5/2011
DE 102013219588 A1 4/2014
(Continued)

OTHER PUBLICATIONS

Extended European Search Report dated Nov. 18, 2021 for the corresponding European Patent Application No. 17928892.3.
(Continued)

*Primary Examiner* — Thomas J Williams
*Assistant Examiner* — James K Hsiao
(74) *Attorney, Agent, or Firm* — Leason Ellis LLP; Edward J. Ellis; Melvin C. Garner

(57) ABSTRACT

A suspension device includes: a suspension including a damping device which damps a force generated between a vehicle body and a wheel; and a damping force control unit that increases a damping force of the damping device so as to be greater than the damping force generated when an acceleration of change in a stroke amount is less than a predetermined value determined in advance, when the acceleration of the change in the stroke amount is equal to or greater than the predetermined value, in which the stroke amount is an amount of displacement from a reference position of the wheel with respect to the vehicle body in an extension direction of the suspension.

8 Claims, 22 Drawing Sheets

(51) Int. Cl.
*F16F 9/512* (2006.01)
*F16F 9/516* (2006.01)

(52) U.S. Cl.
CPC ...... *B60G 2202/24* (2013.01); *B60G 2300/12* (2013.01); *B60G 2400/10* (2013.01); *B60G 2400/25* (2013.01); *B60G 2500/114* (2013.01); *B60G 2600/70* (2013.01); *B60G 2800/91* (2013.01)

(58) Field of Classification Search
CPC .......... B60G 2500/114; B60G 2600/70; B60G 2800/91; F16F 9/48; F16F 9/512; F16F 9/516
See application file for complete search history.

(56) References Cited

U.S. PATENT DOCUMENTS

| | | | | |
|---|---|---|---|---|
| 5,324,069 | A * | 6/1994 | Ogawa | B60G 17/018 280/5.515 |
| 5,328,202 | A * | 7/1994 | Kakizaki | B60G 17/08 280/5.515 |
| 5,445,405 | A * | 8/1995 | Onozawa | B60G 17/019 280/5.506 |
| 5,515,273 | A * | 5/1996 | Sasaki | B60G 17/08 280/DIG. 1 |
| 5,532,921 | A * | 7/1996 | Katsuda | B60G 17/016 280/5.515 |
| 5,802,478 | A * | 9/1998 | Iwasaki | B60G 17/08 180/41 |
| 5,921,572 | A * | 7/1999 | Bard | B60G 17/0152 280/5.515 |
| 8,892,280 | B2 * | 11/2014 | Kinoshita | B60W 10/08 701/1 |
| 9,033,122 | B2 * | 5/2015 | Ericksen | B62K 25/08 188/282.4 |
| 9,399,383 | B2 * | 7/2016 | Blankenship | B60G 17/01908 |
| 9,452,654 | B2 * | 9/2016 | Ericksen | B60G 17/016 |
| 9,758,005 | B2 * | 9/2017 | Kanda | B60G 17/08 |
| 9,884,533 | B2 * | 2/2018 | Blankenship | F16F 9/463 |
| 10,479,160 | B2 * | 11/2019 | Roessle | B60G 13/001 |
| 10,588,233 | B2 * | 3/2020 | Dunaway | B60G 13/08 |
| 2013/0001030 | A1 * | 1/2013 | Goldasz | F16F 9/464 188/313 |
| 2014/0095024 | A1 | 4/2014 | Hirao | |
| 2015/0081171 | A1 * | 3/2015 | Ericksen | B60G 17/018 701/37 |
| 2016/0159189 | A1 | 6/2016 | Hirao | |
| 2022/0154798 | A1 * | 5/2022 | Forster | F04B 11/0033 |

FOREIGN PATENT DOCUMENTS

| | | |
|---|---|---|
| DE | 102020125350 A1 * | 3/2022 |
| EP | 2939857 A2 | 11/2015 |
| FR | 3006986 A1 | 12/2014 |
| JP | 02-018109 A | 1/1990 |
| JP | 02-254009 A | 10/1990 |
| JP | 2002-227927 A | 8/2002 |
| JP | 2005-035486 A | 2/2005 |
| JP | 2009234323 A | 10/2009 |
| JP | 2012-001160 A | 1/2012 |
| JP | 5224058 B2 | 7/2013 |
| JP | 2016-070460 A | 5/2016 |

OTHER PUBLICATIONS

International Search Report dated Jan. 16, 2018 for the corresponding PCT International Application No. PCT/JP2017/039373.
Written Opinion of the International Searching Authority dated Jan. 16, 2018 for the corresponding PCT International Application No. PCT/JP2017/039373.

* cited by examiner

SUSPENSION DEVICE AND RECORDING MEDIUM

CROSS-REFERENCE TO RELATED APPLICATION(S)

This application is a continuation of PCT application No. PCT/JP2017/039373, which was filed on Oct. 31, 2017, which claims the benefit of priority to Japanese Patent Application No. 2017-202899 filed on Oct. 19, 2017, the contents of which are incorporated herein by reference.

TECHNICAL FIELD

The present invention relates to a suspension device and a recording medium.

BACKGROUND ART

In the related art, there have been proposed techniques for reducing the impact of shocks when the suspension device is in the most extended state (hereinafter, may be referred to as "maximum extension state").

For example, the front fork described in PTL 1 includes an outer tube on a wheel side, an inner tube on a vehicle body side, which enters and exits the outer tube, a suspension spring (spring element) provided inside the inner tube to elastically support the vehicle body, a cylinder provided inside the outer tube along an axial direction, a piston provided on a wheel side of the inner tube and partitions an outer peripheral chamber formed between the outer tube and the cylinder into an extension side chamber and a compression side chamber, and a guide provided on a vehicle body side of the cylinder and partitions a reservoir formed inside the inner tube protruding from the cylinder and the extension side chamber, in which the cylinder includes a throttle hole on an axial vehicle body side, which communicates an inner chamber formed inside the cylinder with an outer chamber, a valve member which is formed with an axial wheel side opening, and which opens and closes a vehicle body side opening of the cylinder and is biased in a closing direction by the spring element, and a suction passage for permitting a flow of fluid from the reservoir to the inner chamber.

PTL 1: Japanese Unexamined Patent Application Publication No. 2016-70460

When a mechanism is provided to obtain an effect (hereafter, referred to as "oil lock effect") of suppressing movement of a moving member by increasing hydraulic pressure in a partitioned chamber by an extendable spring and the moving member in order to damp an impact at the time of maximum extension (at the time of full extension), the degree of freedom in setting the damping force is reduced. In order to damp the impact in the maximum extension state, it is also possible to set the damping force so that remaining speed of the piston in the maximum extension state can be sufficiently reduced. However, when such a setting is performed, the damping force is increased even when there is no possibility of the most extended state, which may adversely affect the ride comfort.

It is an object of the present invention to provide a suspension device and the like, capable of increasing the degree of freedom in setting the damping force without deteriorating the ride comfort.

SUMMARY OF INVENTION

According to the present invention, there is provided a suspension device including a suspension including a damping device which damps a force generated between a vehicle body and a wheel, and a damping force control unit that increases a damping force of the damping device such that the damping force generated when an acceleration of a change in a stroke amount is equal to or greater than a predetermined value determined in advance becomes greater than the damping force generated when the acceleration of the change in the stroke amount is less than the predetermined value. The stroke amount is an amount of displacement from a reference position of the wheel with respect to the vehicle body in an extension direction of the suspension. In the present invention, when the suspension is in the most extended state (fully extended state), the stroke amount can be set to 0, for example. That is, the stroke amount decreases as the suspension is extended, and the stroke amount increases as the suspension is compressed.

In the present example, a predetermined value setting unit may be further provided, which sets the predetermined value so that the predetermined value is decreased as the stroke amount is decreased.

The damping force control unit may increase the damping force as the acceleration is increased.

According to the present invention, there is provided a suspension device including a suspension including a damping device which damps a force generated between a vehicle body and a wheel, and a first control unit that controls a damping force using a speed of change in a stroke amount, the stroke amount being an amount of displacement from a reference position of the wheel with respect to the vehicle body in an extension direction of the suspension, a determination unit that determines whether the suspension goes into the most extended state under a first damping force controlled by the first control unit, and a second control unit that controls the damping force so as to be greater than the first damping force when the determination unit determines that the suspension goes into the most extended state.

In the present example, when the acceleration of the change in the stroke amount is equal to or greater than a predetermined value determined in advance, the determination unit may determine that the suspension goes into the most extended state.

A predetermined value setting unit may be further provided, which sets the predetermined value such that the predetermined value is decreased as the stroke amount is decreased.

The second control unit may increase the damping force as the acceleration of the change in the stroke amount is increased.

According to the present invention, there is provided a non-transitory computer-readable recording medium recording a program that causes a computer to implement a function of, in an extension direction of a suspension including a damping device that damps a force generated between a vehicle body and a wheel, when an acceleration of change in a stroke amount, which is an amount of displacement from a reference position of the wheel with respect to the vehicle body, is equal to or greater than a predetermined value determined in advance, increasing a damping force of the damping device so as to be greater than the damping force generated when the acceleration is less than the predetermined value.

According to the present invention, there is provided a non-transitory computer-readable recording medium recording a program that causes a computer to implement a first control function of, in an extension direction of a suspension including a damping device that damps a force generated between a vehicle body and a wheel, using a speed of change in a stroke amount, which is an amount of displacement from a reference position of the wheel with respect to the vehicle body, controlling a damping force of the damping device, a function of determining whether the suspension goes into the most extended state under a first damping force controlled by the first control function, and a second control function of controlling the damping force so as to be greater than the first damping force when the determination unit determines that the suspension goes into the most extended state.

According to the present invention, it is possible to increase the degree of freedom in setting the damping force without deteriorating the ride comfort.

DESCRIPTION OF EMBODIMENTS

Hereinafter, embodiments of the present invention will be described in detail with reference to the attached drawings.

First Embodiment

Figure 1:
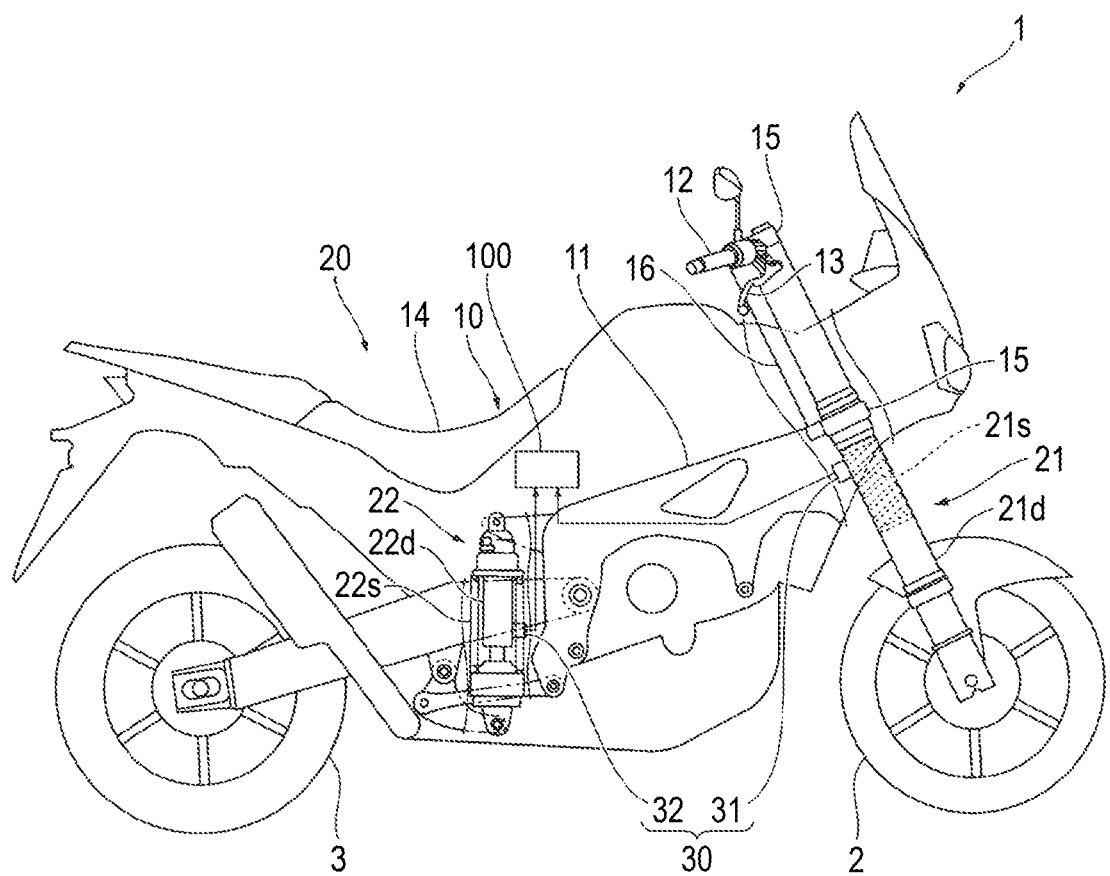
FIG. 1 is a diagram illustrating a schematic configuration of a motorcycle 1.

FIG. 1 is a diagram illustrating a schematic configuration of a motorcycle 1.

Figure 2:
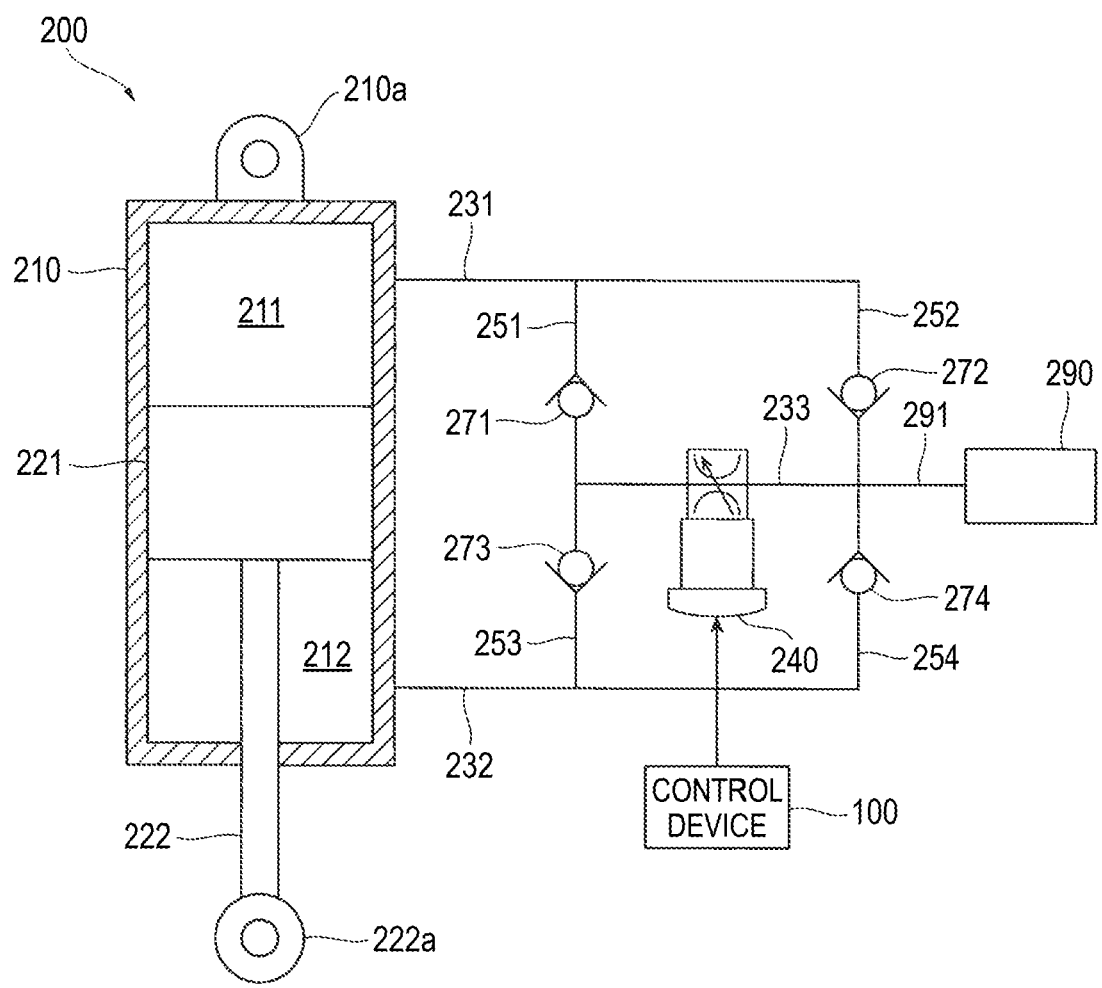
FIG. 2 is a diagram illustrating a schematic configuration of a damping device 200.

FIG. 2 is a diagram illustrating a schematic configuration of a damping device 200.

Figure 3:
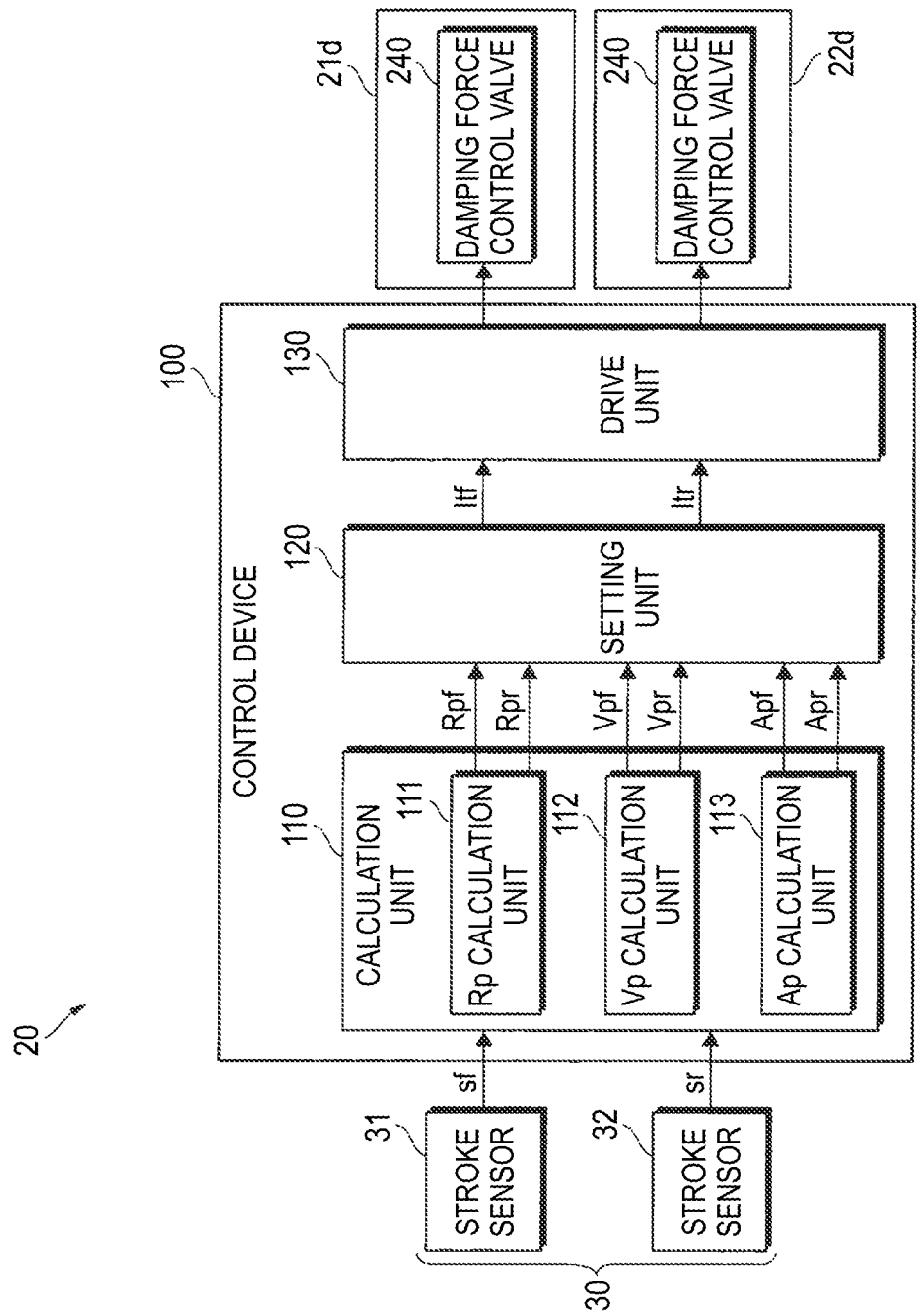
FIG. 3 is a diagram illustrating a schematic configuration of a control device 100.

FIG. 3 is a diagram illustrating a schematic configuration of a control device 100.

The motorcycle 1 includes a wheel on a front side as a front wheel 2, a wheel on a rear side as a rear wheel 3, and a vehicle body 10. The vehicle body 10 includes a vehicle body frame 11 which forms a framework of the motorcycle 1, a handle 12, a brake lever 13, a seat 14, and the like.

The motorcycle 1 includes a front wheel side suspension 21 connecting the front wheel 2 and the vehicle body 10. The motorcycle 1 includes two brackets 15 for holding a suspension 21 disposed on the left side of the front wheel 2 and a suspension 21 disposed on the right side of the front wheel 2, and a shaft 16 disposed between the two brackets 15. The shaft 16 is rotatably supported by the vehicle body frame 11. The suspension 21 includes a suspension spring 21s that absorbs an impact applied to the front wheel 2 from a road surface or the like, and a damping device 21d that damps the vibration of the suspension spring 21s.

The motorcycle 1 includes a suspension 22 on the rear wheel side. The suspension 22 includes a suspension spring 22s that absorbs an impact applied to the rear wheel 3 from a road surface or the like, and a damping device 22d that damps the vibration of the suspension spring 22s. The damping device 22d damps the force generated between the rear wheel 3 and the vehicle body 10.

In the following description, the damping device 21d and the damping device 22d may sometimes be collectively referred to as the "damping device 200".

The suspension 21 on the front wheel side and the suspension 22 on the rear wheel side may sometimes be collectively referred to as the "suspension". The front wheel 2 and the rear wheel 3 may sometimes be collectively referred to as the "wheel". The suspension spring 21s and the suspension spring 22s may sometimes be collectively referred to as the "spring".

The motorcycle 1 includes a control device 100 that controls the damping force of the damping device 21d and the damping device 22d. The control device 100 receives output signals from a stroke sensor 31 that detects a stroke amount of the suspension 21 and a stroke sensor 32 that detects a stroke amount of the suspension 22. In the following description, the stroke sensor 31 and the stroke sensor 32 may sometimes be collectively referred to as a "stroke sensor 30".

The suspension device 20 according to the present invention is a device including suspensions (the suspension 21 and the suspension 22) and the control device 100.

(Damping Device)

The damping device 200 includes a cylinder 210 filled with hydraulic fluid, a piston 221 movably accommodated in the cylinder 210, and a piston rod 222 for holding the piston 221. An end 210a of one side (upper side in FIG. 2) of the cylinder 210 is connected to the vehicle body 10. The piston rod 222 includes one end holding the piston 221 and the other end 222a (the lower side in FIG. 2) connected to the wheel. Note that the damping device according to the present invention is not limited to such a form. In the damping device according to the present invention, the other end of the cylinder 210 may be connected to the wheel, the other end of the piston rod 222 may hold the piston 221, and the one end of the piston rod 222 may be connected to the vehicle body 10.

In the damping device 200, a compression stroke is performed, in which the piston 221 is moved toward the vehicle body 10 (upper side in FIG. 2), thus decreasing the overall length of the damping device 200, and an extension stroke is performed, in which the piston 221 is moved toward the wheel (lower side in FIG. 2), thus increasing the overall length of the damping device 200.

Inside of the cylinder 210 included is the piston 221 accommodated in the cylinder 210, and is divided into a compression-side oil chamber 211 where the pressure of the hydraulic fluid is increased in the compression stroke, and an extension-side oil chamber 212 where the pressure of the hydraulic fluid is increased in the extension stroke.

The damping device 200 includes a first oil passage 231 connected to the oil chamber 211 in the cylinder 210 and a second oil passage 232 connected to the oil chamber 212 in the cylinder 210. The damping device 200 includes a third oil passage 233 provided between the first oil passage 231 and the second oil passage 232, and a damping force control valve 240 provided in the third oil passage 233. The damping device 200 includes a first branch passage 251 connecting the first oil passage 231 and one end of the third oil passage 233, and a second branch passage 252 connecting the first oil passage 231 and the other end of the third oil passage 233. The damping device 200 includes a third branch passage 253 connecting the second oil passage 232 and one end of the third oil passage 233, and a fourth branch passage 254 connecting the second oil passage 232 and the other end of the third oil passage 233.

The damping device 200 includes a first check valve 271 provided in the first branch passage 251 to allow the movement of the hydraulic fluid from the first oil passage 231 to the third oil passage 233, and restrict the movement of the hydraulic fluid from the third oil passage 233 toward the first oil passage 231. The damping device 200 includes a second check valve 272 provided in the second branch passage 252 to allow the movement of the hydraulic fluid from the third oil passage 233 to the first oil passage 231, and restrict the movement of the hydraulic fluid from the first oil passage 231 toward the third oil passage 233.

The damping device 200 includes a third check valve 273 provided in the third branch passage 253 to allow the movement of the hydraulic fluid from the second oil passage 232 to the third oil passage 233, and restrict the movement of the hydraulic fluid from the third oil passage 233 toward the second oil passage 232. The damping device 200 includes a fourth check valve 274 provided in the fourth branch passage 254 to allow the movement of the hydraulic fluid from the third oil passage 233 to the second oil passage 232, and restrict the movement of the hydraulic fluid from the second oil passage 232 toward the third oil passage 233.

The damping device 200 includes a reservoir 290 having a function of storing the hydraulic fluid and supplying and discharging the hydraulic fluid, and a reservoir passage 291 connecting the reservoir 290 and the other end of third oil passage 233.

The damping force control valve 240 includes a solenoid and may control the pressure of the hydraulic fluid passing through the valve, by controlling an amount of current energized to the solenoid. The damping force control valve 240 according to the present embodiment increases the pressure of the hydraulic fluid passing through the valve as the amount of current supplied to the solenoid is increased. The amount of current for energizing the solenoid is controlled by the control device 100.

When the piston 221 is moved toward the oil chamber 211, the hydraulic pressure in the oil chamber 211 is increased. Then, the hydraulic fluid in the oil chamber 211 flows to the damping force control valve 240 through the first oil passage 231 and the first branch passage 251. The pressure of the hydraulic fluid passing through the damping force control valve 240 is adjusted by the valve pressure of the damping force control valve 240, so that the damping force on the compression side is adjusted. The hydraulic fluid that passed the damping force control valve 240 flows into the oil chamber 212 through the fourth branch passage 254 and the second oil passage 232.

Meanwhile, when the piston 221 is moved toward the oil chamber 212, the hydraulic pressure in the oil chamber 212 is increased. Then, the hydraulic fluid in the oil chamber 212 flows to the damping force control valve 240 through the second oil passage 232 and the third branch passage 253. The pressure of the hydraulic fluid passing through the damping force control valve 240 is adjusted by the valve pressure of the damping force control valve 240, so that the damping force on the extension side is adjusted. The hydraulic fluid that passed the damping force control valve 240 flows into the oil chamber 211 through the second branch passage 252 and the first oil passage 231.

(Control Device 100)

The control device 100 is an arithmetic logic operation circuit including a CPU, a ROM, a RAM, a backup RAM, and the like.

The control device 100 receives a stroke signal sf of the front wheel side, which is an output signal converted from a stroke amount Rpf of the suspension 21 detected by the stroke sensor 31. The control device 100 receives a stroke signal sr of the rear wheel side, which is an output signal converted from a stroke amount Rpr of the suspension 22 detected by the stroke sensor 32.

The control device 100 controls the amount of current supplied to the solenoid of the damping force control valve 240 to control the damping force. Specifically, when increasing the damping force, the control device 100 increases the amount of current supplied to the solenoid of the damping force control valve 240, and when reducing the damping force, the control device 100 reduces the amount of current supplied to the solenoid of the damping force control valve 240.

The control device 100 includes a calculation unit 110 that calculates the stroke amounts Rpf, Rpr, and the like of the suspension using the stroke signals sf and sr detected from the stroke sensor 30. The control device 100 includes a setting unit 120 that sets target currents Itf and Itr supplied to the solenoid of the damping force control valve 240, and a drive unit 130 that drives the damping force control valve 240.

The calculation unit 110 includes a Rp calculation unit 111 that calculates the stroke amounts Rpf and Rpr. The calculation unit 110 includes a Vp calculation unit 112 that calculates an amount of change in the stroke amounts Rpf and Rpr per unit time, in other words, calculates speeds Vpf and Vpr, which are the speeds of the change in the stroke amounts Rpf and Rpr (stroke speeds). The calculation unit 110 includes an Ap calculation unit 113 that calculates an amount of change in the speeds Vpf and Vpr per unit time, in other words, calculates accelerations Apf and Apr, which are accelerations of changes in the stroke amounts Rpf and Rpr.

The Rp calculation unit 111 calculates the stroke amount Rpf of the suspension 21 using the output value from the stroke sensor 31. The Rp calculation unit 111 calculates the stroke amount Rpr of the suspension 22 using the output value from the stroke sensor 32. The stroke amount Rpf and the stroke amount Rpr may sometimes be collectively referred to as a "stroke amount Rp". The stroke amount Rp is an amount of displacement from a reference position of the wheel with respect to the vehicle body 10. For example, when the suspension is in the most extended state, the stroke amount Rp may be set to 0. That is, the stroke amount Rp is decreased as the suspension is extended, and the stroke amount Rp is increased as the suspension is compressed.

The Vp calculation unit 112 calculates the speed Vpf of the front wheel side by calculating the amount of change in the stroke amount Rpf calculated by the Rp calculation unit 111 per unit time. The Vp calculation unit 112 calculates the speed Vpr of the rear wheel side by calculating the amount of change in the stroke amount Rpr calculated by the Rp calculation unit 111 per unit time. The speed Vpf and the speed Vpr may sometimes be collectively referred to as a "speed Vp". In the following description, it is assumed that the sign is positive when the stroke amount Rp is changed in the extension direction of the suspension, and the sign is negative when the stroke amount Rp is changed in the compression direction of the suspension, and the sign of the speed Vp in the extension direction of the suspension is positive, and the sign of the speed Vp in the compression direction of the suspension is negative.

The Ap calculation unit 113 calculates an acceleration Apf of the front wheel side by calculating the amount of change in the speed Vpf calculated by the Vp calculation unit 112 per unit time. The Ap calculation unit 113 calculates an acceleration Apr of the rear wheel side by calculating the amount of change in the speed Vpr calculated by the Vp calculation unit 112 per unit time. The acceleration Apf and the acceleration Apr may sometimes be collectively referred to as an "acceleration Ap". In the following description, it is assumed that the sign of the acceleration Ap in the extension direction of the suspension is positive, and the sign of the acceleration Ap in the compression direction of the suspension is negative.

The setting unit 120 will be described in detail below.

For example, the driving unit 130 includes, as a switching element, a transistor (field effect transistor; FET) connected between the positive side line of the power supply and the coil of the solenoid of the damping force control valve 240.

More specifically, the drive unit 130 causes the transistor to switch such that the target current supplied to the damping force control valve 240 of the damping device 21*d* is the target current Itf set by the setting unit 120. The drive unit 130 causes the transistor to switch such that the target current supplied to the damping force control valve 240 of the damping device 22*d* is the target current Itr set by the setting unit 120.

Hereinafter, the setting unit 120 will be described in more detail.

Figure 4:
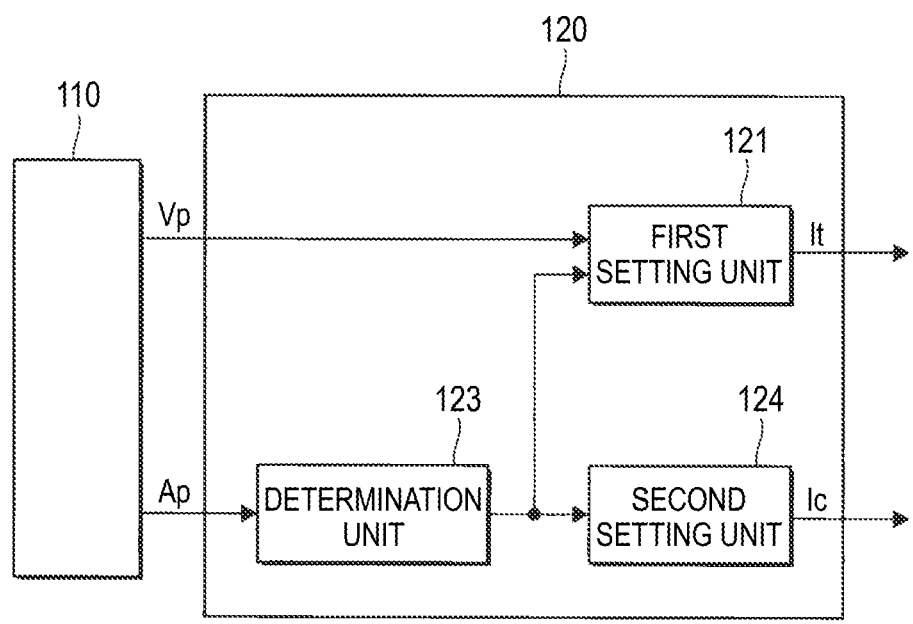
FIG. 4 is a diagram illustrating a schematic configuration of a setting unit 120.

FIG. 4 is a diagram illustrating a schematic configuration of the setting unit 120.

The setting unit 120 includes a first setting unit 121 that sets a target current It to be supplied to the solenoid of the damping force control valve 240, using the speeds Vpf and Vpr calculated by the Vp calculation unit 112.

The setting unit 120 includes a determination unit 123 that determines whether the suspension goes into the most extended state, under a first damping force of the damping device 200 according to the target current It set by the first setting unit 121.

The setting unit 120 includes a second setting unit 124 that sets the target current It to be supplied to the solenoid of the damping force control valve 240 of the damping device 200, when the determination unit 123 determines that the suspension goes into the most extended state.

The first setting unit 121 sets a target current Itf of the front wheel side to be supplied to the solenoid of the damping force control valve 240 of the damping device 21*d* using the speed Vpf. The first setting unit 121 sets a target current Itr of the rear wheel side to be supplied to the solenoid of the damping force control valve 240 of the damping device 22*d* using the speed Vpr. Note that the method of setting the target current Itf by the first setting unit 121 is the same as the method of setting the target current Itr by the first setting unit 121. Hereinafter, the target current Itf and the target current Itr may sometimes be collectively referred to as a "target current It".

Figure 5:
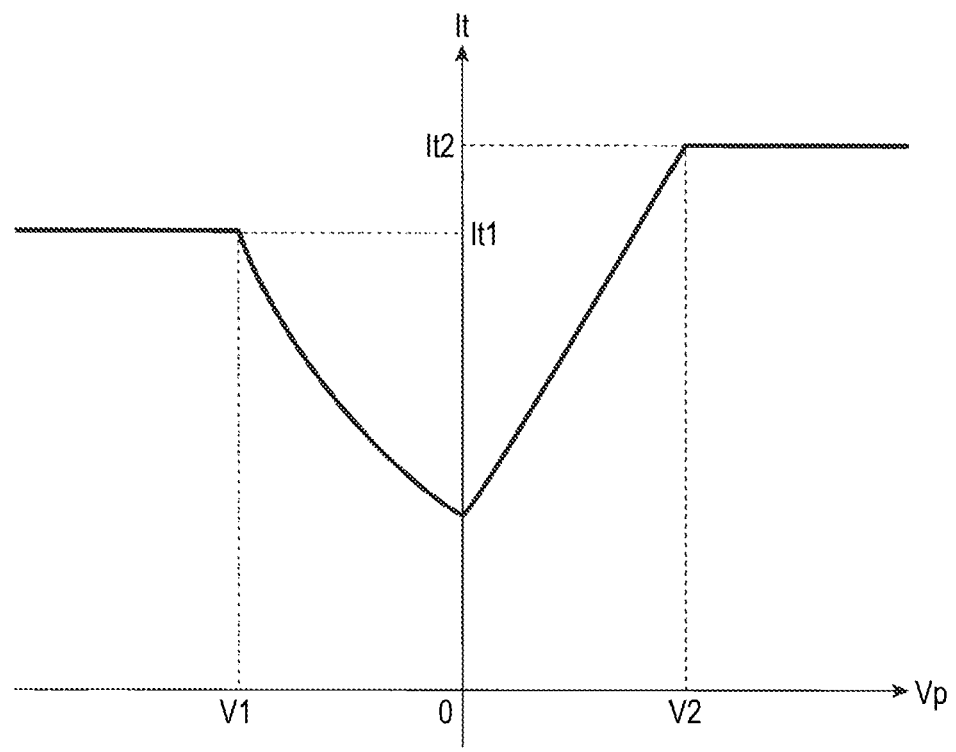
FIG. 5 is a schematic diagram of a control map representing an example of relationship between a target current and a stroke speed.

FIG. 5 is a schematic diagram of a control map representing an example of relationship between the target current It and the speed Vp.

The first setting unit 121 calculates a target current It according to the speed Vp (the speed Vpf or the speed Vpr). For example, the first setting unit 121 substitutes the speed Vp into the control map illustrated in FIG. 5 representing the relationship between the target current It and the speed Vp, which is heuristically generated in advance and recorded in the ROM to calculate the target current It.

In the control map illustrated in FIG. 5, when the speed Vp is the speed in the compression direction of the suspension, and when the speed Vp is equal to or greater than a first predetermined speed V1, the target current It is set to be increased as the speed Vp is decreased. When the speed Vp is less than the first predetermined speed V1, the target current It is set to be the predetermined current It1 in the compression direction. When the speed Vp is the speed in the extension direction of the suspension, and when the speed Vp is equal to or less than a second predetermined speed V2, the target current It is set to be increased as the speed Vp is increased. When the speed Vp is greater than the second predetermined speed V2, the target current It is set to be a predetermined current It2 in the extension direction. Note that the first setting unit 121 may switch and use a control map representing the relationship between the target current It and the speed Vp, according to the vehicle speed which is the moving speed of the motorcycle 1. The first setting unit 121 sets the target current It when the determination unit 123 determines that the suspension does not go into the most extended state. As such, the first setting unit 121 controls the damping force of the damping device 200 by setting the target current It.

The first setting unit 121 may determine whether the suspension goes into the most extended state, using the speed Vp calculated by the Vp calculation unit 112 and extracted by the low-pass filter. The low pass filter is a filter that removes frequency band components greater than a predetermined frequency (for example, 5 Hz) and extracts only low frequency band components less than the predetermined frequency.

The determination unit 123 determines whether the suspension 21 on the front wheel side goes into the most extended state, under the damping force of the damping device 21d according to the target current Itf set by the first setting unit 121. The determination unit 123 determines whether the suspension 22 on the rear wheel side goes into the most extended state, under the damping force of the damping device 22d according to the target current Itr set by the first setting unit 121. The method of the determination unit 123 determining whether the suspension goes into the most extended state will be described below in detail.

When the determination unit 123 determines that the suspension 21 on the front wheel side goes into the most extended state, the second setting unit 124 sets a predetermined suppression current Icf of the front wheel side to the target current Itf. The suppression current Icf may be exemplified as a current greater than the target current Itf set by the first setting unit 121 (for example, a current greater than the predetermined current It2), and a current that can maximize the damping force of the damping device 21d. The suppression current Icf may be exemplified as the maximum current that can be supplied to the solenoid of the damping force control valve 240 of the damping device 21d.

When the determination unit 123 determines that the suspension 22 on the rear wheel side goes into the most extended state, the second setting unit 124 sets a predetermined control current Icr of the rear wheel side to the target current Itr. The suppression current Icr is a current greater than a current greater than the target current Itr set by the first setting unit 121 (for example, a current greater than the predetermined current It2), and a current that can maximize the damping force of the damping device 22d. The suppression current Icr may be exemplified as the maximum current that can be supplied to the solenoid of the damping force control valve 240 of the damping device 22d.

Hereinafter, the suppression current Icf and the suppression current Icr may sometimes be collectively referred to as a "suppression current Ic".

(Determination Method)

Next, the method of the determination unit 123 determining whether the suspension goes into the most extended state will be described.

Figure 6:
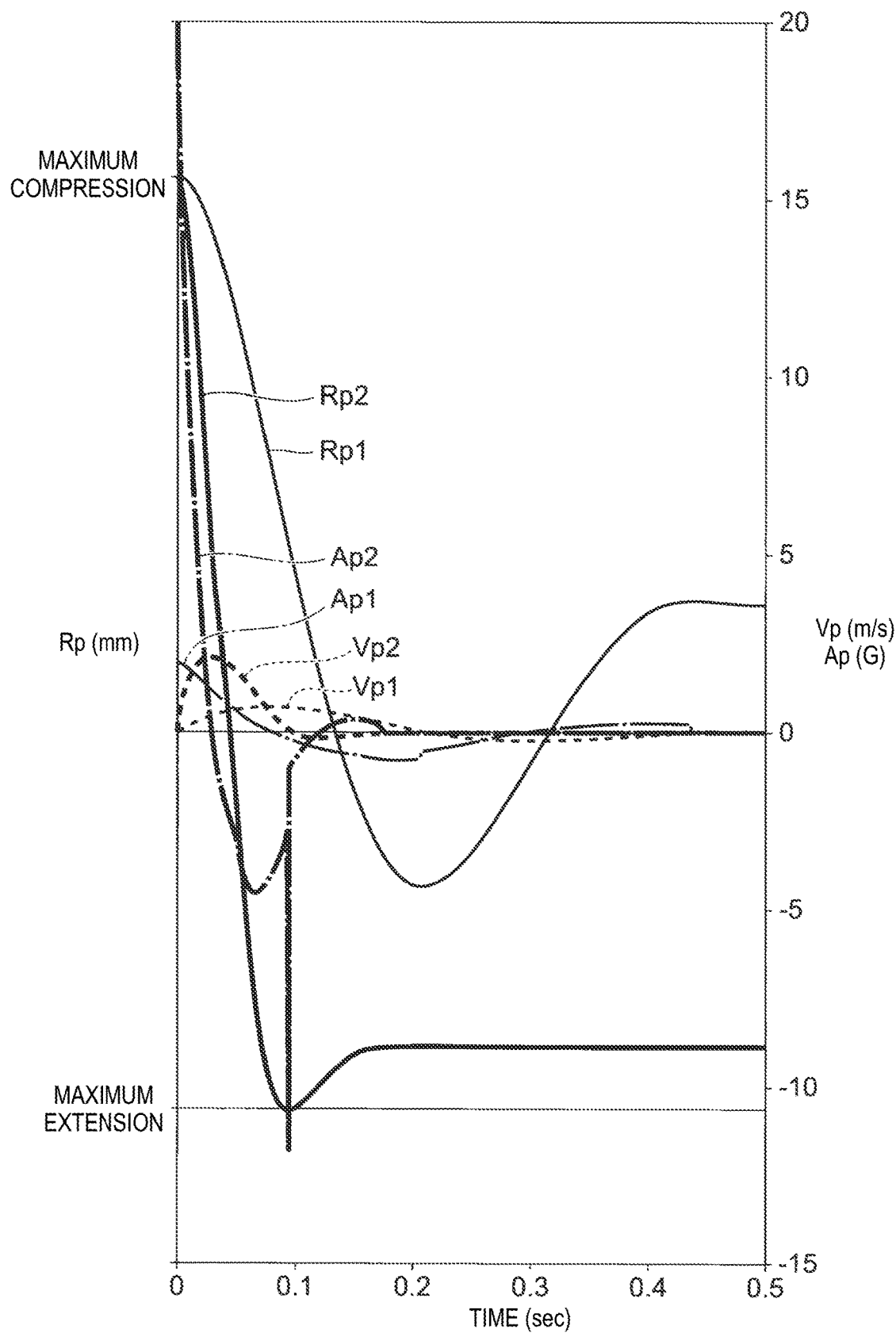
FIG. 6 is a diagram illustrating an example of changes in stroke amount, speed and acceleration, when the restraint of the vehicle body is released after the suspension is compressed most by fixing the wheels, and when the restraint of wheels is released after the suspension is compressed most by fixing the vehicle body.

FIG. 6 is a diagram illustrating an example of changes in stroke amount, speed and acceleration, when the restraint of the vehicle body 10 is released after the suspension is compressed most by fixing the wheels, and when the restraint of wheels is released after the suspension is compressed most by fixing the vehicle body 10.

The situation (hereinafter, may sometimes be referred to as "Situation 1") in which the restraint of the vehicle body 10 is released after the suspension is compressed most (in the state of maximum stroke amount Rp) by fixing the wheels, may occur when the motorcycle 1 lands after jumping, after the suspension is compressed most, for example. On the other hand, a situation (hereinafter may be referred to as "Situation 2") in which the restraint of wheels is released after the suspension is compressed most (in the state of the maximum stroke amount Rp) by fixing the vehicle body 10, may occur when the wheels are lifted off from the road surface immediately after a jump of the motorcycle 1, for example. Hereinafter, the stroke amount Rp, the speed Vp, and the acceleration Ap in Situation 1 will be referred to as a stroke amount Rp1, a speed Vp1, and an acceleration Ap1, respectively. The stroke amount Rp, the speed Vp, and the acceleration Ap in Situation 2 will be referred to as a stroke amount Rp2, a speed Vp2, and an acceleration Ap2, respectively.

When the suspension is compressed most, the spring is compressed most, and so the potential energy of the spring is accumulated. The vehicle body 10 has a greater mass than the wheels (for example, the mass of the vehicle body 10 is five times the mass of the wheels). The gravity acting on the vehicle body 10 acts in the direction of compressing the suspension, while the gravity acting on the wheels acts in the direction of extending the suspension.

For the above reasons, as illustrated in the changes in stroke amount Rp1 in FIG. 6, in Situation 1, the suspension does not reach the most extended state (the state of minimum stroke amount Rp1). Meanwhile, as illustrated in the changes in the stroke amount Rp2 in FIG. 6, in Situation 2, the suspension reaches the most extended state.

For the above reason, as illustrated in FIG. 6, the acceleration Ap2 immediately after releasing the restraint of the wheels in Situation 2 is about 10 times the acceleration Ap1 immediately after releasing the restraint of the vehicle body 10 in Situation 1. For example, while the acceleration Ap1 is 2G, the acceleration Ap2 is 20G (1G=9.8 (m/s$^2$)). Depending on the model of the motorcycle 1, the acceleration Ap1 is considered to be 10 G at most. Meanwhile, the acceleration Ap2 is considered to be 20G or more in any model. Therefore, regardless of the model of the motorcycle 1, the acceleration Ap2 in Situation 2 is considered to be twice or more as much as the acceleration Ap1 in Situation 1.

As illustrated in the change in the speed Vp1 in FIG. 6, immediately after releasing the restraint of the vehicle body 10, the speed Vp1 is small, so the damping force of the damping device 200 is small. Likewise, as illustrated in the speed Vp2 in FIG. 6, immediately after releasing the restraint of wheels, the speed Vp2 is small, so the damping force of the damping device 200 is small.

From these facts, it can be seen that when the acceleration Ap is large, there is a possibility that the suspension may reach the most extended state thereafter.

In view of the matters described above, when the acceleration Ap calculated by the Ap calculation unit 113 is equal to or greater than a predetermined value determined in advance, the determination unit 123 determines that there is a possibility that the suspension may reach the most extended state.

The predetermined value may be exemplified as a value determined in consideration of the following. As can also be seen from FIG. 6, when the restraint of the wheels is released after the suspension is compressed most, the suspension reaches the most extended state thereafter. Meanwhile, when the restraint of the vehicle body 10 is released after the suspension is compressed most, the suspension does not reach the most extended state thereafter. The difference is due to the difference between the values of the acceleration Ap1 and the acceleration Ap2. The acceleration Ap immediately after releasing the restraint of the vehicle body 10 after the suspension is compressed most is considered to be 10G at most regardless of the model of the motorcycle 1. From the above, it may be exemplified that the predetermined value is 10G.

The determination unit 123 may determine whether the suspension goes into the most extended state, using the acceleration Ap calculated by the Ap calculation unit 113 and extracted by the low-pass filter. The low pass filter is a filter that removes frequency band components greater than a predetermined frequency (for example, 5 Hz) and extracts only low frequency band components less than the predetermined frequency.

Next, the procedure of the target current setting processing performed by the setting unit 120 will be described using a flowchart.

Figure 7:
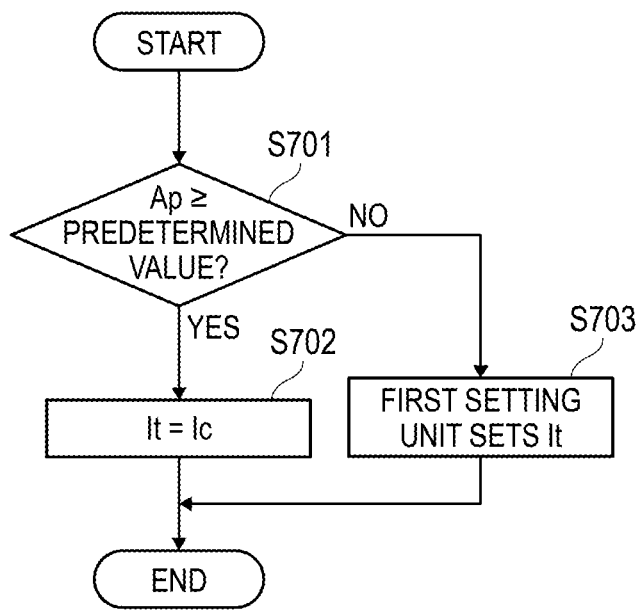
FIG. 7 is a flowchart illustrating a procedure of target current setting processing performed by the setting unit 120.

FIG. 7 is a flowchart illustrating a procedure of target current setting processing performed by the setting unit 120.

The setting unit 120 repeatedly executes the target current setting processing every predetermined period (for example, 1 millisecond).

The setting unit 120 determines whether the acceleration Ap is equal to or greater than a predetermined value (step 701 (hereinafter, the step may sometimes be referred to as "S")). It is processing in which the determination unit 123 acquires the acceleration Ap calculated by the Ap calculation unit 113, and determines whether the acquired acceleration Ap is equal to or greater than a predetermined value.

When the acceleration Ap is equal to or greater than the predetermined value (Yes in S701), the second setting unit 124 sets the suppression current Ic described above to the target current It (S702).

Meanwhile, when the acceleration Ap is less than the predetermined value (No in S701), the first setting unit 121 acquires the speed Vp calculated by the Vp calculation unit 112, and sets the value calculated based on the acquired speed Vp and the control map illustrated in FIG. 5 to the target current It (S703). The suppression current Ic is greater than the target current It set by the first setting unit 121. Therefore, in the above manner, when the acceleration Ap is equal to or greater than the predetermined value, the control device 100 increases the damping force of the damping device 200 to be greater than when the acceleration Ap is less than the predetermined value.

The following advantages can be obtained by the control device 100 controlling the damping force of the damping device 200 as such. For example, the damping force is increased early when the restraint of the wheels are released after the suspension is compressed, such as, when the wheel is lifted off from the road surface immediately after the motorcycle 1 jumps. As a result, the suspension is controlled so as not to go into the most extended state. Therefore, a spring for relieving the impact when the suspension goes into the most extended state, and a mechanism for obtaining the oil lock effect will not be necessary. As a result, the degree of freedom in setting the damping force of the suspension is increased. Meanwhile, when the restraint of the vehicle body 10 is released after the suspension is compressed, such as when the motorcycle 1 lands after jumping, the damping force corresponds to the speed Vp and is smaller than the damping force corresponding to the suppression current Ic. Therefore, the ride comport is better than when the suppression current Ic is set. As described above, according to the control device 100, when there is a possibility that the suspension goes into the most extended state, the damping force is increased, so that it is possible to perform control to suppress the most extended state and at the same time, suppress the adverse influence on the ride comfort caused by performing such control.

As described above, the suspension device 20 includes the suspension including the damping device 200 that damps the force generated between the vehicle body 10 and the wheels. The suspension device 20 includes a second setting unit 124 as an example of the damping force control unit that, when the acceleration Ap of the suspension in the extension direction is equal to or greater than a predetermined value determined in advance, increases the damping force of the damping device 200 to be greater than when the acceleration Ap is less than the predetermined value. According to the suspension device 20, when there is a possibility that the suspension goes into the most extended state, it is possible to suppress the most extended state by increasing the damping force. According to the suspension device 20, it is possible to perform control to suppress going into the most extended state, while suppressing the adverse influence on the ride comfort caused by performing such control.

The suspension device 20 includes a suspension including a damping device 200 that damps the force generated between the vehicle body 10 and the wheels, and a first setting unit 121 as an example of the first control unit that controls the damping force using the speed Vp in the extension direction of the suspension. The suspension device 20 includes a determination unit 123 that determines whether the suspension goes into the most extended state, from the first damping force according to the control of the first setting unit 121 (the damping force according to the target current It set by the first setting unit 121). The suspension device 20 includes a second setting unit 124 as an example of the second control unit that controls the damping force to be greater than the first damping force when the determination unit 123 determines that the suspension goes into the most extended state. According to the suspension device 20, when there is a possibility that the suspension goes into the most extended state, the damping force is increased, so that it is possible to suppress going into the most extended state and at the same time, suppress the adverse influence on the ride comfort caused by performing the control to suppress going into the most extended state.

In the present example, when the acceleration Ap of the change in the stroke amount Rp is equal to or greater than a predetermined value determined in advance, the determination unit 123 may determine that the suspension goes into the most extended state. As a result, the determination unit 123 can determine with high accuracy that the suspension goes into the most extended state.

The processing performed by the control device 100 described above may be implemented by cooperation of software and hardware resources. Here, a CPU in the control computer provided in the control device 100 executes a program for implementing each function of the control device 100 to implement each of these functions. For example, a non-transitory computer readable recording medium recording a program is provided to the control device 100, and the CPU in the control device 100 reads the program stored in the recording medium. Here, the program itself read from the recording medium implements the functions of the embodiment described above, and the program itself and the recording medium recording the same are included in the present invention. The recording media for supplying such programs may be exemplified as flexible disks, CD-ROMs, DVD-ROMs, hard disks, optical disks, magneto-optical disks, CD-Rs, magnetic tapes, non-volatile memory cards, and ROMs.

Figure 8:
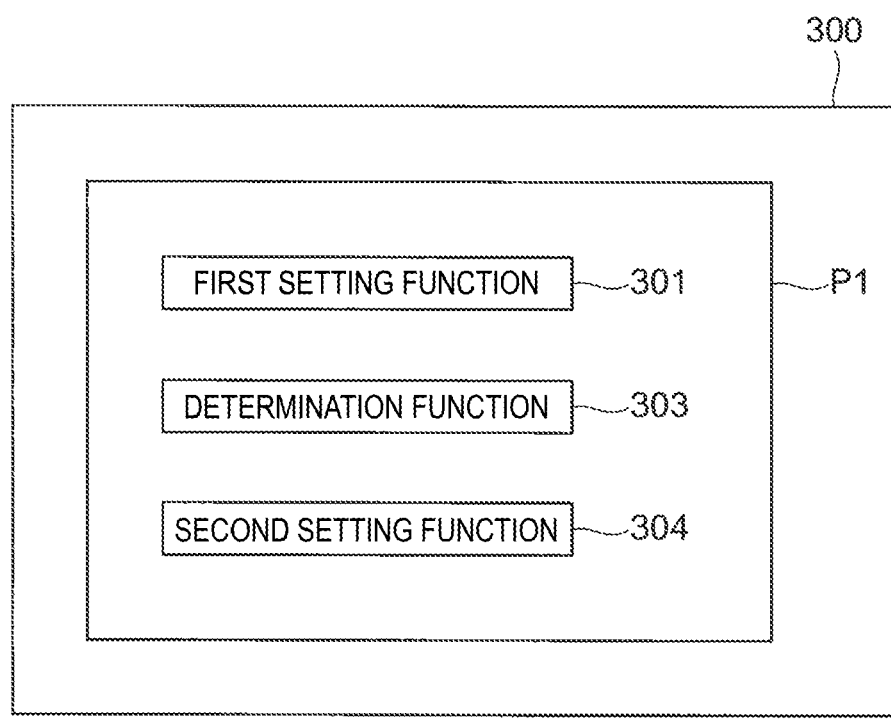
FIG. 8 is a diagram illustrating a schematic configuration of a recording medium 300.

FIG. 8 is a diagram illustrating a schematic configuration of a recording medium 300. The recording medium 300 is a non-transitory computer readable recording medium storing a program P1 that causes a computer to implement the function of controlling the damping force of the damping device 200.

As illustrated in FIG. 8, the recording medium 300 stores a program P1. The program P1 has a first setting function 301 of setting the target current It to be supplied to the solenoid of the damping force control valve 240 using the speed Vp.

The program P1 has a determination function 303 of determining whether the suspension goes into the most extended state, under the damping force of the damping device 200 according to the target current It set by the first setting function 301.

The program P1 has a second setting function 304 of setting the target current It to be supplied to the solenoid of the damping force control valve 240, when the determination function 303 determines is the suspension goes into the most extended state.

The first setting function 301 is a module that implements the function of the first setting unit 121 illustrated in FIG. 4.

The determination function 303 is a module that implements the function of the determination unit 123 illustrated in FIG. 4.

The second setting function 304 is a module that implements the function of the second setting unit 124 illustrated in FIG. 4.

As described above, the recording medium 300 is a non-transitory computer readable recording medium which records a program P1 that causes a computer to implement the function of controlling the damping force of the damping device 200. When the acceleration Ap of the suspension including the damping device 200 in the extension direction is equal to or greater than a predetermined value, the recorded program P1 causes the computer to implement the second setting function 304 as an example of the function of increasing the damping force of the damping device 200 to be greater than when the acceleration Ap is less than the predetermined value.

The recorded program P1 causes the computer to implement the first control function 301 as an example of the first setting function of controlling the damping force of the damping device 200 using the speed Vp of the suspension including the damping device 200 in the extension direction. The recorded program P1 causes the computer to implement the determination function 303 as an example of the function of determining whether the suspension goes into the most extended state under the first damping force according to the control of the first setting function 301. The recorded program P1 causes the computer to implement the second setting function 304 as an example of the second control function of controlling the damping force to be greater than the first damping force when it is determined to go into the most extended state. In the present example, when the acceleration Ap is equal to or greater than a predetermined value determined in advance, the determination function 303 may determine that the suspension goes into the most extended state.

After the program read from the recording medium 300 is written in the memory in the control computer provided in the control device 100, the CPU or the like may perform part or all of the actual processing based on the instructions of the program, and the functions of the embodiment described above may be implemented by the processing. The software program for implementing the functions according to the embodiment is distributed through a network to be stored in a recording unit such as a hard disk or a ROM of the control device 100 or a recording medium such as a CD-RW or a CD-R. Then, the CPU of the control device 100 may read out and execute the program stored in the recording unit or the recording medium at the time of use.

Second Embodiment

Figure 9:
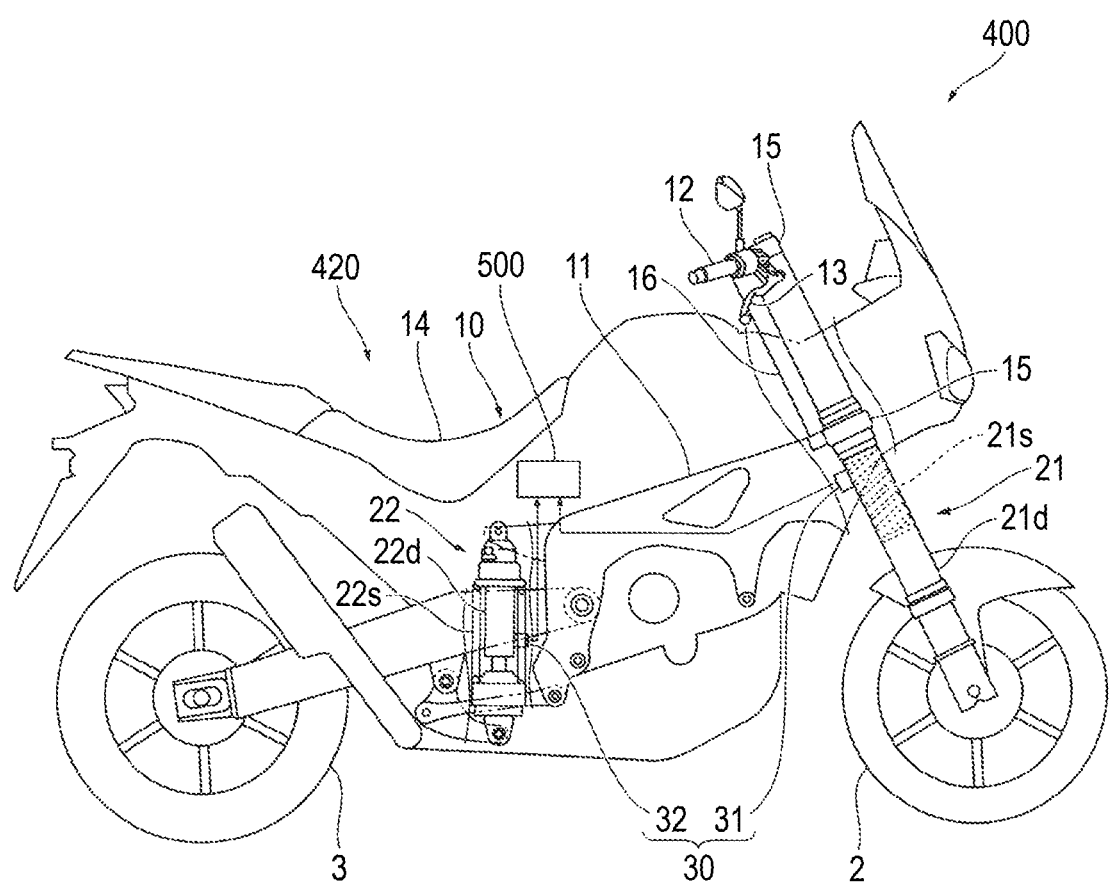
FIG. 9 is a diagram illustrating a schematic configuration of a motorcycle 400.

FIG. 9 is a diagram illustrating a schematic configuration of a motorcycle 400.

Figure 10:
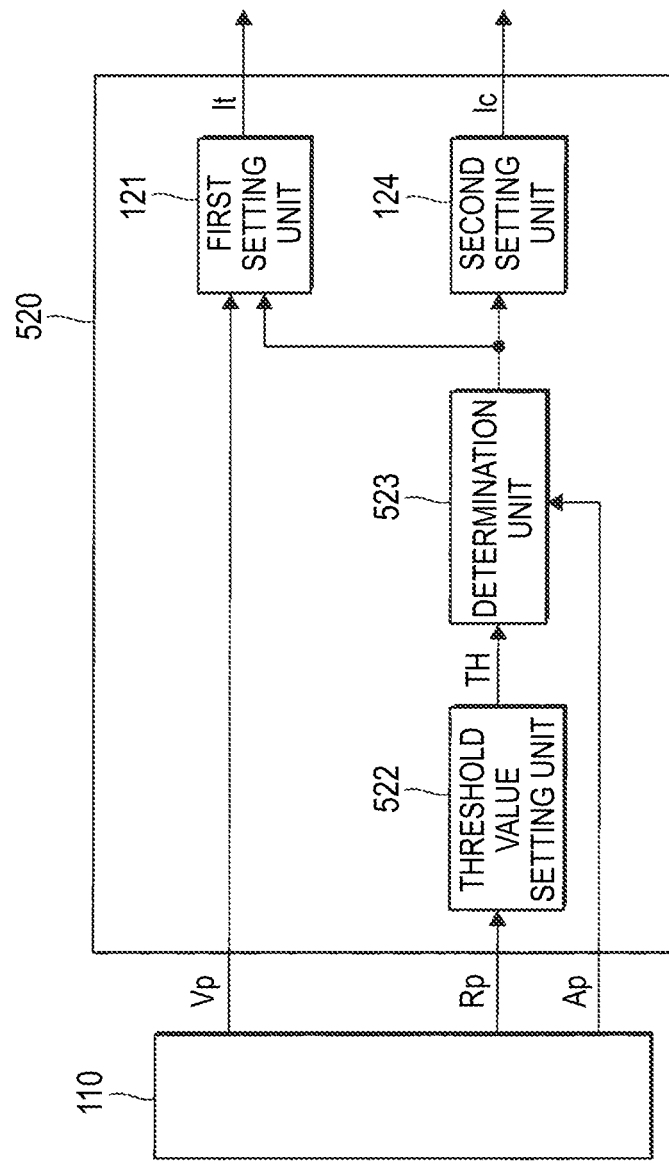
FIG. 10 is a diagram illustrating a schematic configuration of a setting unit 520.

FIG. 10 is a diagram illustrating a schematic configuration of a setting unit 520.

The motorcycle 400 is different from the motorcycle 1 in that the setting unit 520 is provided instead of the setting unit 120. The setting unit 520 is different from the setting unit 120 in that the setting unit 520 includes a threshold setting unit 522 that sets a threshold value TH using the stroke amount Rp. Hereinafter, differences from the motorcycle 1 will be described. In the motorcycle 1 and the motorcycle 400, components having the same shape and function are denoted by the same reference numerals, and a detailed description thereof will be omitted.

As illustrated in FIG. 9, the motorcycle 400 includes a control device 500 that controls the damping force of the damping devices 21d and 22d. The suspension device 420 according to the present invention is a device including suspensions (the suspension 21 and the suspension 22) and the control device 500.

The control device 500 includes a calculation unit 110, a setting unit 520, and a drive unit 130.

As illustrated in FIG. 10, the setting unit 520 includes a first setting unit 121 and a second setting unit 124.

The setting unit 520 includes the threshold setting unit 522 that sets the threshold value TH. The method of setting the threshold value TH will be described in detail below.

The setting unit 520 includes a determination unit 523 that uses the threshold value TH set by the threshold value setting unit 522 to determine whether the suspension goes into the most extended state, under the damping force of the damping device 200 according to the target current It set by the first setting unit 121. More specifically, the determination unit 523 determines that the suspension goes into the most extended state when the acceleration Ap calculated by the Ap calculation unit 113 is equal to or greater than the threshold value TH set by the threshold setting unit 522.

Figure 11:
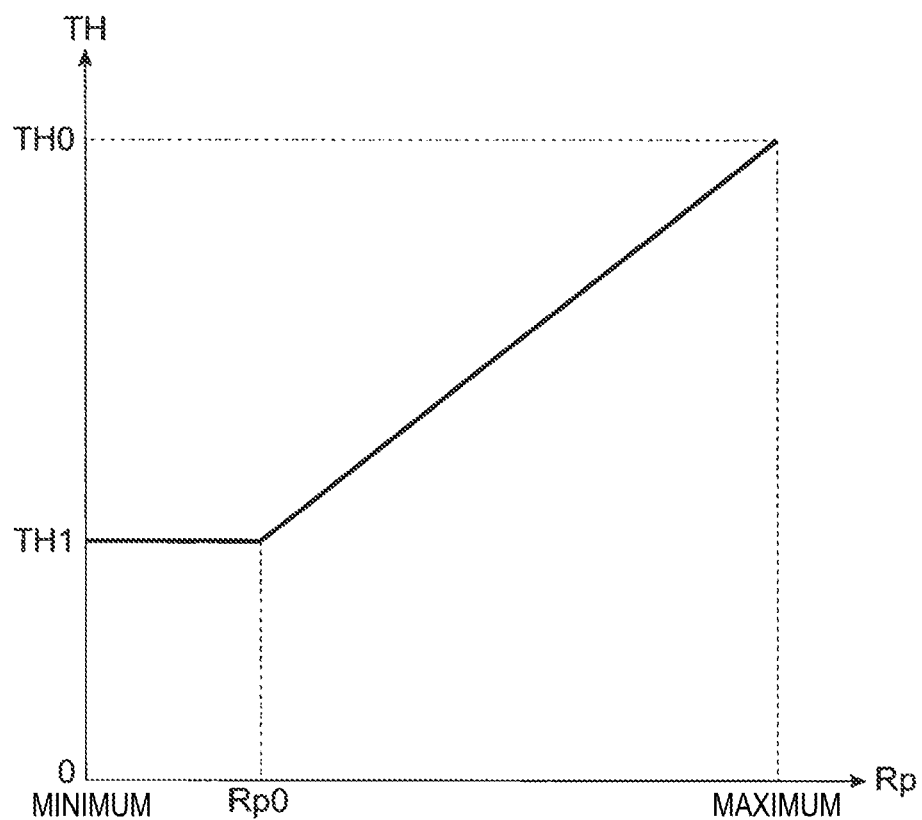
FIG. 11 is a schematic diagram of a control map representing an example of relationship between a stroke amount and a threshold value.

FIG. 11 is a schematic diagram of a control map representing an example of relationship between the stroke amount Rp and the threshold value TH.

The threshold setting unit 522 sets the threshold value TH according to the value of the stroke amount Rp.

The smaller the stroke amount Rp is, the smaller the amount of extension is, until the suspension goes into the most extended state (with the minimum stroke amount Rp). Therefore, as the stroke amount Rp is decreased, the suspension is more likely to reach the most extended state despite the smaller acceleration Ap. Therefore, in order to suppress the suspension in the most extended state, it is desirable that the threshold value TH be decreased as the stroke amount Rp is decreased. However, when the stroke amount Rp is large, and when the threshold value TH is decreased, even in a situation (for example, Situation 1 described above) in which there is no possibility that the suspension goes into the most extended state, it is determined that there is a possibility to going into the most extended state as the acceleration Ap is equal to or greater than the threshold TH. Therefore, the threshold setting unit 522 sets a smaller threshold value TH as the stroke amount Rp is decreased, so as to prevent the ride comfort from being deteriorated while suppressing going into the most extended state with high accuracy.

For example, the threshold setting unit 522 substitutes the stroke amount Rp into the control map illustrated in FIG. 11 representing the relationship between the stroke amount Rp and the threshold value TH, which is heuristically generated and recorded in the ROM to calculate the threshold value TH.

In the control map illustrated in FIG. 11, the threshold value TH when the stroke amount Rp is maximum (when the suspension is in the most compressed state) is set to be the threshold value TH0. When the stroke amount Rp is smaller than a predetermined amount Rp0, the threshold value TH is set to a predetermined value (threshold value TH1) determined in advance. Then, when the stroke amount Rp is equal to or greater than the predetermined amount Rp0, the threshold value TH is set to be decreased as the stroke amount Rp is decreased. Note that it may be illustrated that the threshold value TH0 is 10G and the threshold value TH1 is 3G.

Next, the procedure of the target current setting processing performed by the setting unit 520 will be described using a flowchart.

Figure 12:
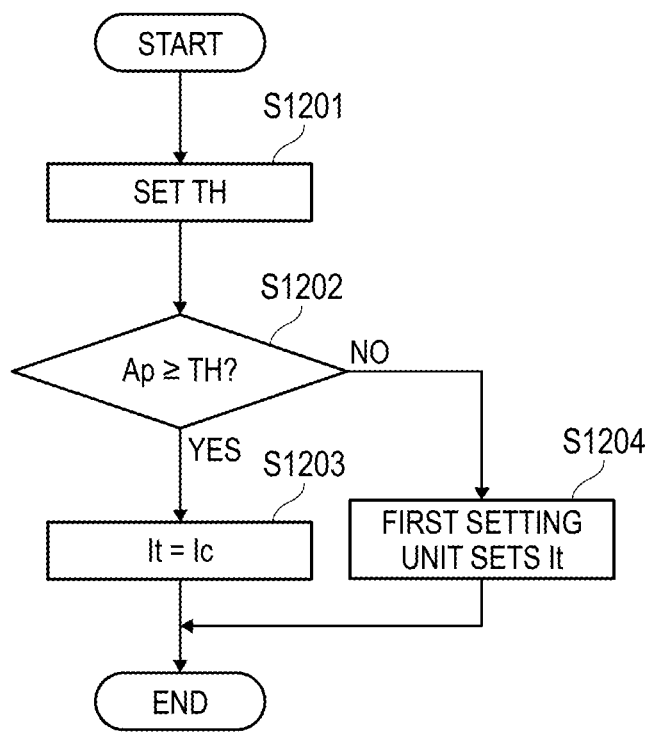
FIG. 12 is a flowchart illustrating a procedure of target current setting processing performed by the setting unit 520.

FIG. 12 is a flowchart illustrating the procedure of the target current setting processing performed by the setting unit 520.

The setting unit 520 repeatedly executes the target current setting processing every predetermined period (for example, 1 millisecond).

The setting unit 520 first sets a threshold value TH (S1201). It is processing in which the threshold setting unit 522 sets the threshold value TH using the stroke amount Rp calculated by the Rp calculation unit 111. Then, the setting unit 520 determines whether the acceleration Ap is equal to or greater than the threshold value TH set in S1201 (S1202). It is processing in which the determination unit 523 acquires the acceleration Ap calculated by the Ap calculation unit 113, and determines whether the acquired acceleration Ap is equal to or greater than a threshold value TH.

When the acceleration Ap is equal to or greater than the threshold value TH (Yes in S1202), the second setting unit 124 sets the suppression current Ic described above to the target current It (S1203).

Meanwhile, when the acceleration Ap is less than the threshold value TH (No in S1202), the first setting unit 121 acquires the speed Vp calculated by the Vp calculation unit 112, and sets the value calculated based on the acquired speed Vp and the control map illustrated in FIG. 5 to the target current It (S1204).

By controlling the damping force of the damping device 200 as such, the control device 500 may suppress with high accuracy the suspension going into the most extended state. As a result, it is possible to increase the degree of freedom in setting the damping force of the suspension with high accuracy.

As described above, the suspension device 420 includes the suspension including the damping device 200 that damps the force generated between the vehicle body 10 and the wheels. The suspension device 420 includes a second setting unit 124 as an example of the damping force control unit that, when the acceleration Ap of the suspension in the extension direction is equal to or greater than a threshold value TH as an example of the predetermined value determined in advance, increases the damping force of the damping device 200 to be greater than when the acceleration Ap is less than a threshold value TH. The suspension device 420 includes a threshold setting unit 522 as an example of the predetermined value setting unit that sets the threshold value TH so that the threshold value TH is decreased as the stroke amount Rp is decreased. According to the suspension device 420, it is possible to suppress with high accuracy the suspension from going into most extended state. As a result, it is possible to increase the degree of freedom in setting the damping force of the suspension with high accuracy. When the acceleration Ap is less than the threshold value TH, the damping force of the damping device 200 is decreased to be smaller than when the acceleration Ap is equal to or greater than the threshold value TH, so that it is possible to suppress the deterioration of the ride comfort caused by performing control to suppress the most extended state.

The suspension device 420 includes a suspension including a damping device 200 which damps the force generated between the vehicle body 10 and the wheels, and a first setting unit 121 as an example of the first control unit that controls the damping force using the speed Vp in the extension direction of the suspension. The suspension device 420 includes a determination unit 523 that determines whether the suspension goes into the most extended state, from the first damping force according to the control of the first setting unit 121 (the damping force according to the target current It set by the first setting unit 121). The suspension device 420 includes the second setting unit 124 as an example of the second control unit that controls the damping force to be greater than the first damping force when the determination unit 523 determines that the suspension goes into the most extended state. The suspension device 420 includes a threshold setting unit 522 as an example of the predetermined value setting unit that sets the threshold value TH so that the threshold value TH is decreased as the stroke amount Rp is decreased. According to the suspension device 420, it is possible to suppress with high accuracy the suspension going into the most extended state. As a result, it is possible to increase the degree of freedom in setting the damping force of the suspension with high accuracy. When the acceleration Ap is less than the threshold value TH, the damping force of the damping device 200 is decreased to be smaller than when the acceleration Ap is equal to or greater than the threshold value TH, so that it is possible to suppress the deterioration of the ride comfort caused by performing the control to suppress going into the most extended state.

Figure 13:
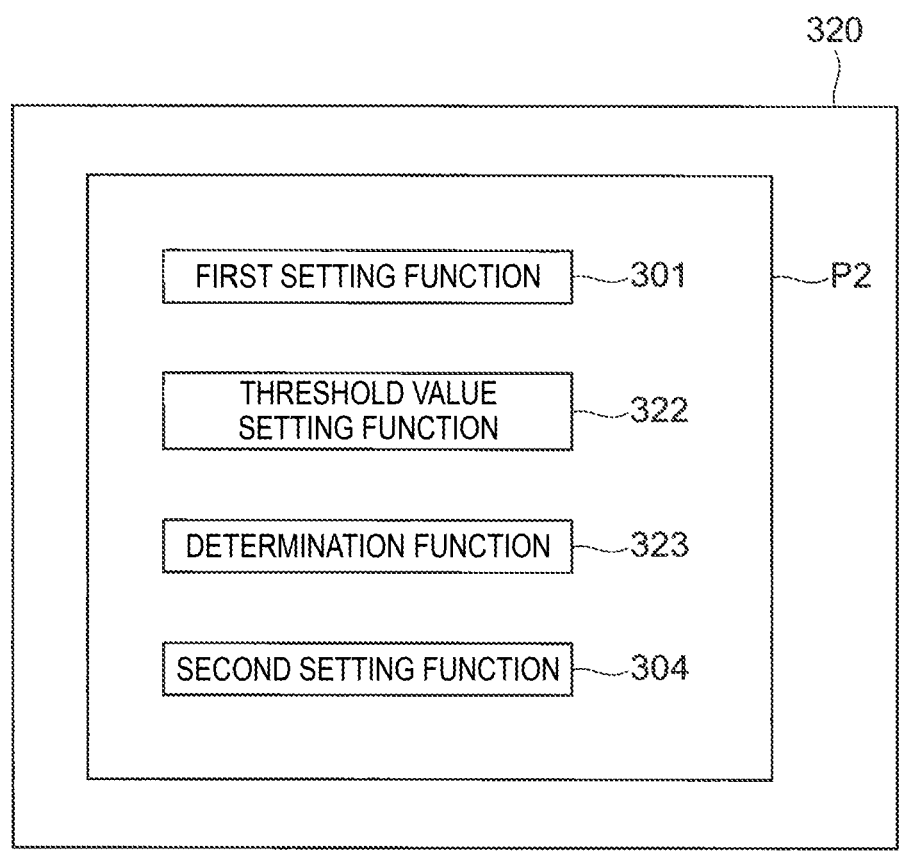
FIG. 13 is a diagram illustrating a schematic configuration of a recording medium 320.

FIG. 13 is a diagram illustrating a schematic configuration of a recording medium 320. The recording medium 320 is a non-transitory computer readable recording medium storing a program P2 that causes a computer to implement the function of controlling the damping force of the damping device 200.

As illustrated in FIG. 13, the recording medium 320 stores a program P2.

The program P2 has a first setting function 301.

The program P2 further has a threshold setting function 322 of setting the threshold value TH and a determination function 323 of determining, using the threshold value TH, whether the suspension goes into the most extended state under the damping force of the damping device 200 according to the target current It set by the first setting function 301.

The program P2 has a second setting function 304 of setting the target current It to be supplied to the solenoid of the damping force control valve 240 when the determination function 323 determines that goes into the most extended state.

The threshold setting function 322 is a module that implements the function of the threshold setting unit 522 illustrated in FIG. 10.

The determination function 323 is a module that implements the function of the determination unit 523 illustrated in FIG. 10.

As described above, the recording medium 320 is a non-transitory computer readable recording medium which records a program P2 that causes a computer to implement the function of controlling the damping force of the damping device 200. When the acceleration Ap of the suspension including the damping device 200 in the extension direction is equal to or greater than the threshold value TH as an example of the predetermined value determined in advance, the recorded program P2 causes the computer to implement the second setting function 304 as an example of the function of increasing the damping force of the damping device 200 to be greater than when the acceleration Ap is less than the threshold value TH. The recorded program P2 causes the computer to implement the threshold setting function 322 of setting the threshold value TH so that the threshold value TH is decreased as the stroke amount Rp is decreased.

The recorded program P2 causes the computer to implement the first control function 301 as an example of the first setting function of controlling the damping force of the damping device 200 using the speed Vp of the suspension including the damping device 200 in the extension direction. The recorded program P2 causes the computer to implement the determination function 323 as an example of the function of determining whether the suspension goes into the most extended state, under the first damping force according to the control of the first setting function 301. The recorded program P2 causes the computer to implement the second setting function 304 as an example of the second control function of controlling the damping force to be greater than the first damping force when it is determined that the suspension goes into the most extended state.

In the present example, the determination function 323 may determine that the suspension goes into the most extended state when the acceleration Ap is equal to or greater than the threshold value TH. Then, the recorded program P2 causes the computer to implement a threshold setting function 322 of setting the threshold value TH so that the threshold value TH is decreased as the stroke amount Rp is decreased.

Third Embodiment

Figure 14:
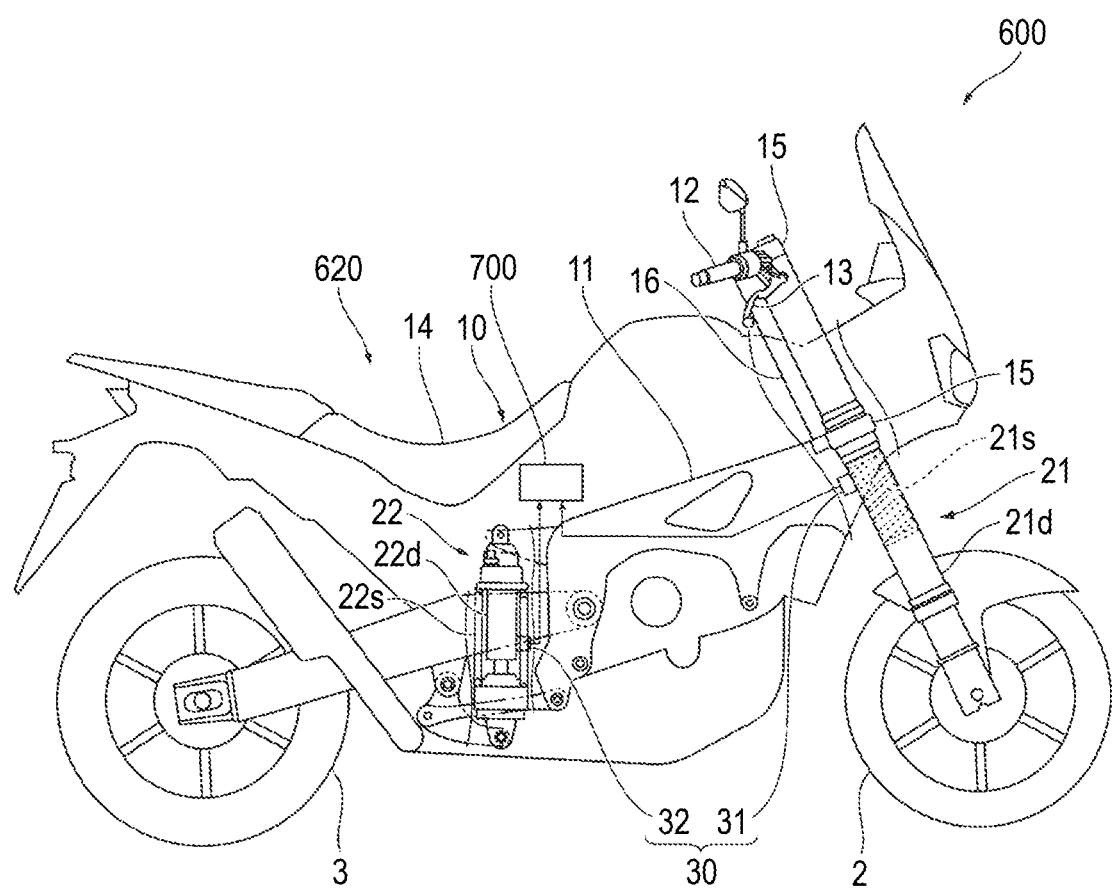
FIG. 14 is a diagram illustrating a schematic configuration of a motorcycle 600.

FIG. 14 is a diagram illustrating a schematic configuration of a motorcycle 600.

Figure 15:
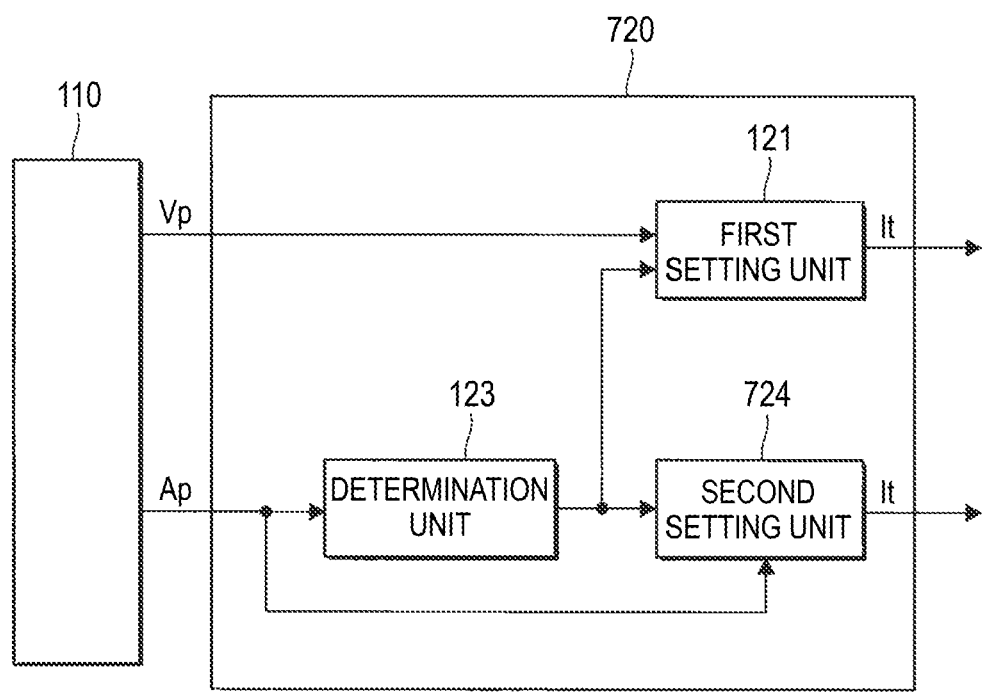
FIG. 15 is a diagram illustrating a schematic configuration of a setting unit 720.

FIG. 15 is a diagram illustrating a schematic configuration of a setting unit 720.

The motorcycle 600 is different from the motorcycle 1 in that a setting unit 720 is provided instead of the setting unit 120. More specifically, the setting unit 720 is different from the setting unit 120 in that a second setting unit 724 is provided instead of the second setting unit 124. Hereinafter, differences from the motorcycle 1 will be described. In the motorcycle 1 and the motorcycle 600, components having the same shape and function are denoted by the same reference numerals, and a detailed description thereof will be omitted.

As illustrated in FIG. 14, the motorcycle 600 includes a control device 700 that controls the damping force of the damping devices 21d and 22d. A suspension device 620 according to the present invention is a device including suspensions (the suspension 21 and the suspension 22) and a control device 700.

The control device 700 includes a calculation unit 110, a setting unit 720, and a drive unit 130.

As illustrated in FIG. 15, the setting unit 720 includes a first setting unit 121 and a determination unit 123.

The setting unit 720 includes a second setting unit 724 that sets the target current It to be supplied to the solenoid of the damping force control valve 240 when the determination unit 123 determines that goes into the most extended state.

Figure 16:
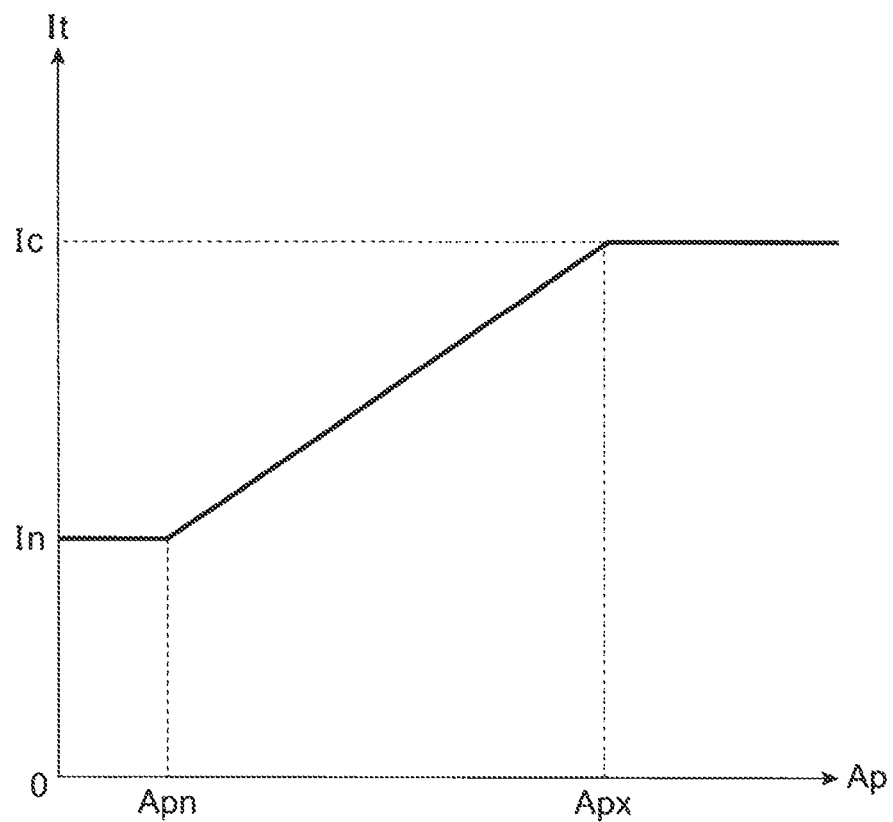
FIG. 16 is a schematic diagram of a control map representing an example of relationship between acceleration and target current.

FIG. 16 is a schematic diagram of a control map representing an example of the relationship between the acceleration Ap and the target current It.

The second setting unit 724 sets a target current It according to the acceleration Ap.

As described above, the greater the acceleration Ap, the more likely the suspension goes into the most extended state (the stroke amount Rp is the minimum). Therefore, the second setting unit 724 sets the target current It to be greater as the acceleration Ap is increased so as to increase the damping force to suppress the most extended state with high accuracy. Meanwhile, even when the acceleration Ap is equal to or greater than the predetermined value, the suspension is less likely to go into the most extended state as the acceleration Ap is decreased. Therefore, the second setting unit 724 sets the target current It to be smaller as the acceleration Ap is decreased so as to reduce the damping force when it is less likely to go into the most extended state, in order to suppress the deterioration of the ride comfort caused by performing the control for suppressing the most extended state.

For example, the second setting unit 724 substitutes the acceleration Ap into the control map, illustrated in FIG. 16 representing the relationship between the acceleration Ap and the target current It, which is heuristically generated and recorded in the ROM to calculate the target current It. In the control map illustrated in FIG. 16, when the acceleration Ap is equal to or greater than a predetermined maximum value Apx, the target current It is set to be the suppression current Ic. When the acceleration Ap is equal to or less than a predetermined minimum value Apn, the target current It is set to be a predetermined minimum current In. When the acceleration Ap is greater than the minimum value Apn and smaller than the maximum value Apx, the target current It is set to increase from the minimum current In to the suppression current Ic as the acceleration Ap is increased. Note that, it may be illustrated that the minimum value Apn is 3G and the maximum value Apx is 15G. The minimum current In may be exemplified as a current greater than the target current It set by the first setting unit 121 (for example, a current greater than the predetermined current It2), and a current smaller than the suppression current Ic.

Next, the procedure of the target current setting processing performed by the setting unit 720 will be described using a flowchart.

Figure 17:
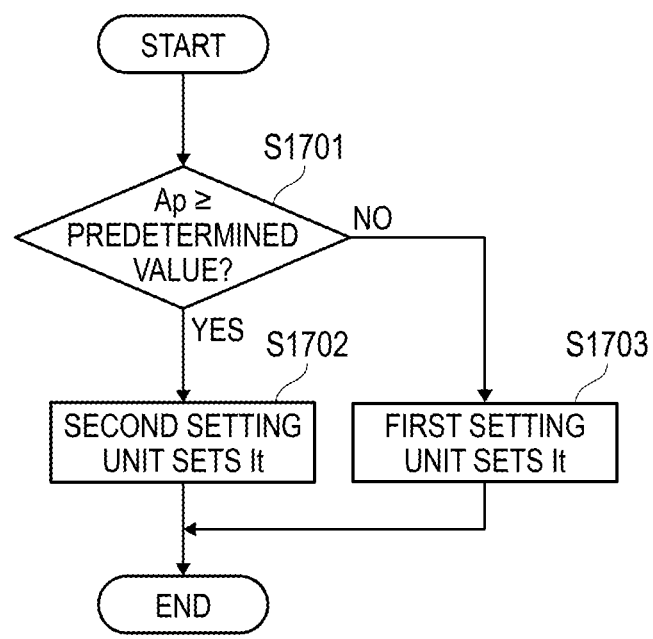
FIG. 17 is a flowchart illustrating a procedure of target current setting processing performed by the setting unit 720.

FIG. 17 is a flowchart illustrating the procedure of the target current setting processing performed by the setting unit 720.

The setting unit 720 repeatedly executes the target current setting processing every predetermined period (for example, 1 millisecond).

The setting unit 720 determines whether the acceleration Ap is equal to or greater than a predetermined value (S1701). It is processing in which the determination unit 123 acquires the acceleration Ap calculated by the Ap calculation unit 113, and determines whether the acquired acceleration Ap is equal to or greater than a predetermined value.

When the acceleration Ap is equal to or greater than the predetermined value (Yes in S1701), the second setting unit 724 sets the target current It (S1702). It is the processing in which the second setting unit 724 acquires the acceleration Ap calculated by the Ap calculation unit 113, and sets the target current It to the value calculated by using the acquired acceleration Ap and the control map illustrated in FIG. 16, for example.

Meanwhile, when the acceleration Ap is less than the predetermined value (No in S1701), the first setting unit 121 sets the target current It (S1703). It is the processing in which the first setting unit 121 acquires the acceleration Vp calculated by the Vp calculation unit 112, and sets, for example, the value calculated by using the acquired acceleration Vp and the control map illustrated in FIG. 5 to the target current It.

By controlling the damping force of the damping device 200 as such, the control device 700 may suppress with high accuracy the suspension in the most extended state. As a result, it is possible to increase the degree of freedom in setting the damping force of the suspension with high accuracy.

As described above, the control device 700 may increase the damping force as the acceleration Ap is increased. That is, the target current It calculated by the second setting unit 724 may be set to be greater as the acceleration Ap is increased, when the acceleration Ap is greater than the minimum value Apn and less than the maximum value Apx (when the acceleration Ap is greater than the first predetermined value Apn and less than the second predetermined value Apx, which is greater than the first predetermined value Apn). Thereby, according to the control device 700, it is possible to suppress the deterioration of the ride comfort caused by performing the control to suppress the most extended state. As a result, it is possible to increase the degree of freedom in setting the damping force of the suspension with high accuracy.

As described above, the suspension device 620 includes the suspension including the damping device 200 that damps the force generated between the vehicle body 10 and the wheel. The suspension device 620 includes a second setting unit 724 as an example of the damping force control unit that, when the acceleration Ap of the suspension in the extension direction is equal to or greater than a predetermined value determined in advance, increases the damping force of the damping device 200 to be greater than when the acceleration Ap is less than a predetermined value. Then, the second setting unit 724 may increase the target current It as the acceleration Ap is increased. That is, the second setting unit 724 may increase the damping force as the acceleration Ap is greater. As a result, according to the suspension device 620, it is possible to suppress with high accuracy the suspension in the most extended state. As a result, it is possible to increase the degree of freedom in setting the damping force of the suspension with high accuracy. According to the suspension device 620, when the acceleration Ap is small, the target current It is reduced to reduce the damping force, so that it is possible to suppress the deterioration of the ride comfort caused by performing the control to suppress the most extended state.

The suspension device 620 includes a suspension including a damping device 200 which damps the force generated between the vehicle body 10 and the wheels, and a first setting unit 121 as an example of the first control unit that controls the damping force using the speed Vp in the extension direction of the suspension. The suspension device 620 includes a determination unit 123 that determines whether the suspension goes into the most extended state, under the first damping force according to the control of the first setting unit 121 (the damping force according to the target current It set by the first setting unit 121). The suspension device 620 includes the second setting unit 724 as an example of the second control unit that controls the damping force to be greater than the first damping force when the determination unit 123 determines that the suspension goes into the most extended state. Then, the second setting unit 724 may increase the target current It as the acceleration Ap is increased. That is, the second setting unit 724 may increase the damping force as the acceleration Ap is greater. As a result, according to the suspension device 620, it is possible to suppress with high accuracy the suspension in the most extended state. As a result, it is possible to increase the degree of freedom in setting the damping force of the suspension with high accuracy. According to the suspension device 620, when the acceleration Ap is small, the target current It is reduced to reduce the damping force, so that it is possible to suppress the deterioration of the ride comfort caused by performing the control to suppress the most extended state.

Figure 18:
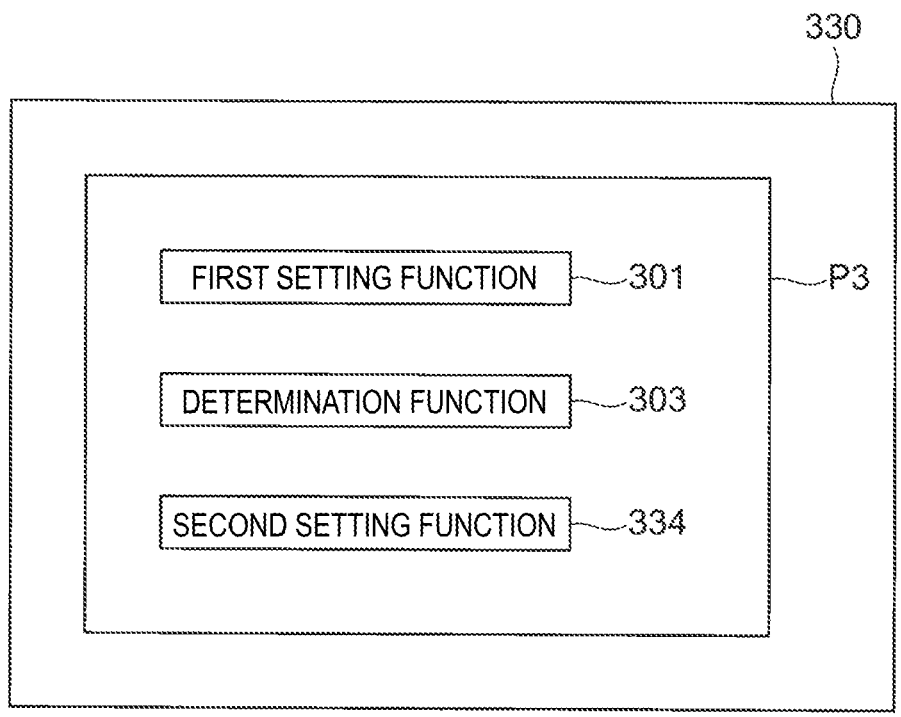
FIG. 18 is a diagram illustrating a schematic configuration of a recording medium 330.

FIG. 18 is a diagram illustrating a schematic configuration of a recording medium 330. The recording medium 330 is a non-transitory computer readable recording medium storing a program P3 that causes a computer to implement the function of controlling the damping force of the damping device 200.

As illustrated in FIG. 18, the recording medium 330 stores a program P3. The program P3 has a first setting function 301 and a determination function 303.

The program P3 has a second setting function 334 of setting the target current It to be supplied to the solenoid of the damping force control valve 240 when the determination function 303 determines that the suspension goes into the most extended state.

The second setting function 334 is a module that implements the function of the second setting unit 724 illustrated in FIG. 15.

As described above, the recording medium 330 is a non-transitory computer readable recording medium which records a program P3 that causes a computer to implement the function of controlling the damping force of the damping device 200. When the acceleration Ap of the suspension including the damping device 200 in the extension direction is equal to or greater than a predetermined value, the recorded program P3 causes the computer to implement the second setting function 334 as an example of the function of increasing the damping force of the damping device 200 to be greater than when the acceleration Ap is less than the predetermined value.

In the present example, the second setting function 334 may increase the target current It as the acceleration Ap is increased.

The recorded program P3 implements, on a computer, a first setting function 301 as an example of the first control function of controlling, in the extension direction of the suspension including the damping device 200, a damping force of the damping device 200 using a speed Vp. The recorded program P3 implements, on the computer, a determination function 303 as an example of the function of determining whether the suspension goes into the most extended state under the first damping force according to the control of the first setting function 301. When determining that the suspension goes into the most extended state, the recorded program P3 implements, on the computer, a second setting function 334 as an example of the second control function of controlling the damping force to be greater than the first damping force.

In the present example, the second setting function 334 may increase the target current It as the acceleration Ap is increased.

Fourth Embodiment

Figure 19:
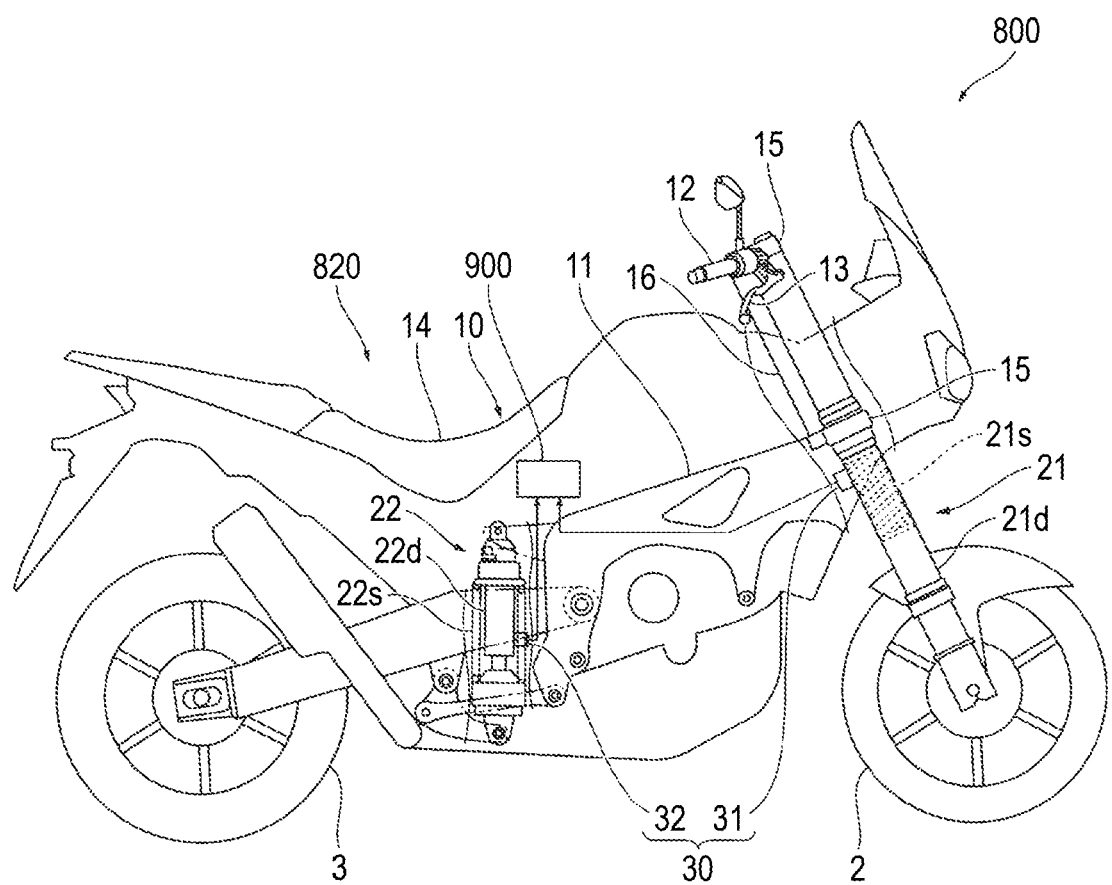
FIG. 19 is a diagram illustrating a schematic configuration of a motorcycle 800.

FIG. 19 is a diagram illustrating a schematic configuration of a motorcycle 800.

Figure 20:
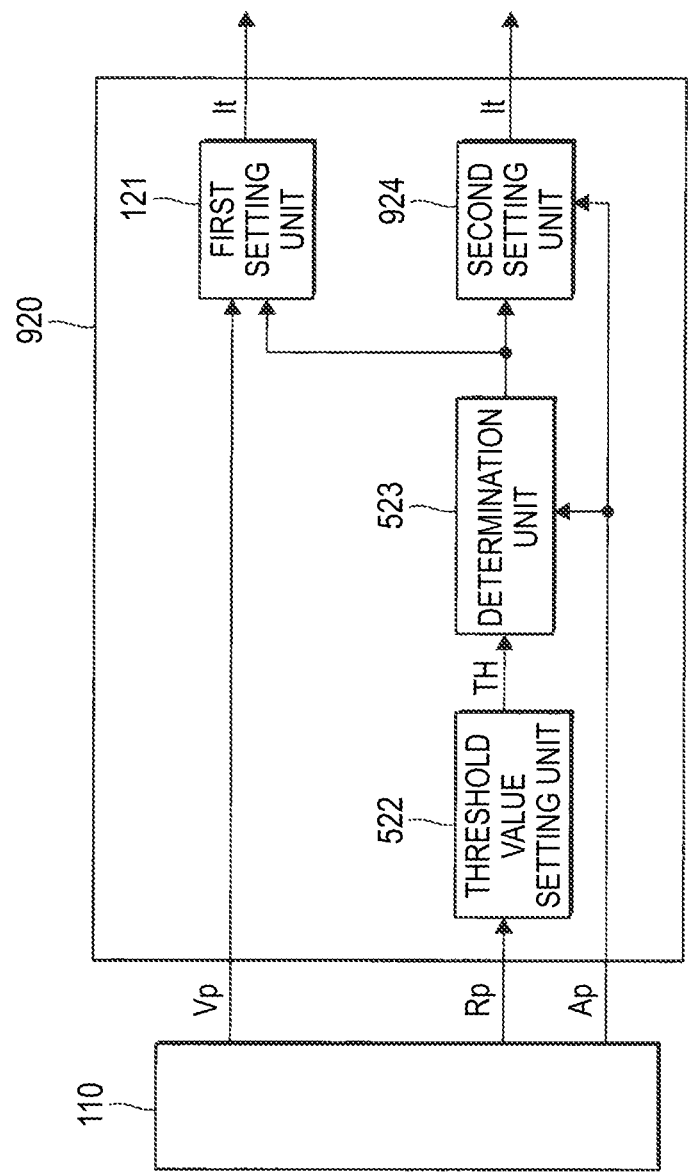
FIG. 20 is a diagram illustrating a schematic configuration of a setting unit 920.

FIG. 20 is a diagram illustrating a schematic configuration of a setting unit 920.

The motorcycle 800 is different from the motorcycle 400 in that a setting unit 920 is provided instead of the setting unit 520. More specifically, the setting unit 920 is different from the setting unit 520 in that a second setting unit 924 is provided instead of the second setting unit 124. Hereinafter, differences from the motorcycle 400 will be described. In the motorcycle 400 and the motorcycle 800, components having the same shape and function are denoted by the same reference numerals, and a detailed description thereof will be omitted.

As illustrated in FIG. 19, the motorcycle 800 includes a control device 900 that controls the damping force of the damping devices 21d and 22d. A suspension device 820 according to the present invention is a device including suspensions (the suspension 21 and the suspension 22) and a control device 900.

The control device 900 includes a calculation unit 110, a setting unit 920, and a drive unit 130.

As illustrated in FIG. 20, the setting unit 920 includes a first setting unit 121, a threshold setting unit 522, and a determination unit 523.

The setting unit 920 includes a second setting unit 924 that sets the target current It to be supplied to the solenoid of the damping force control valve 240 when the determination unit 523 determines that the suspension goes into the most extended state. The second setting unit 924 is configured the same as the second setting unit 724 illustrated in FIG. 15.

Next, the procedure of the target current setting processing performed by the setting unit 920 will be described using a flowchart.

Figure 21:
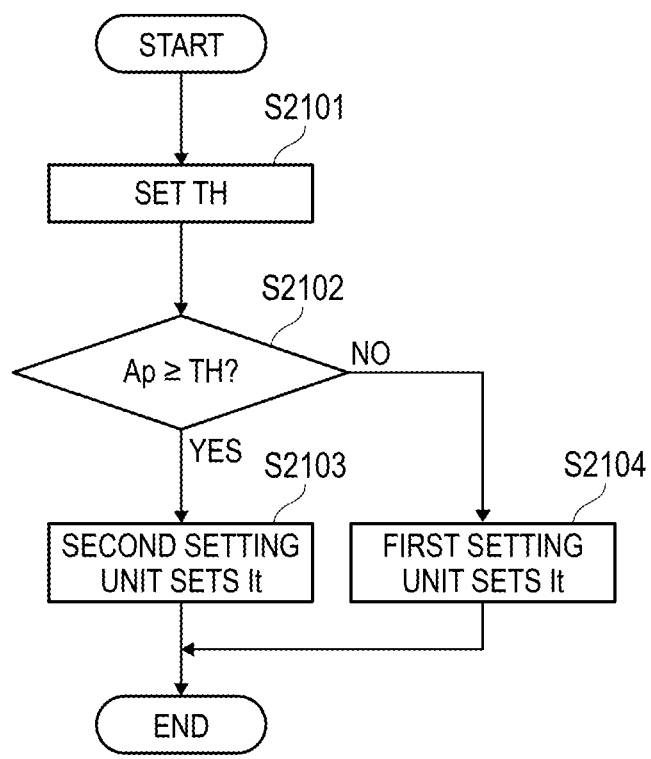
FIG. 21 is a flowchart illustrating a procedure of target current setting processing performed by the setting unit 920.

FIG. 21 is a flowchart illustrating the procedure of the target current setting processing performed by the setting unit 920.

The setting unit 920 repeatedly executes the target current setting processing every predetermined period (for example, 1 millisecond).

The setting unit 920 first sets a threshold value TH (S2101). It is the same processing as the S1201 described above. Then, the setting unit 920 determines whether the acceleration Ap is equal to or greater than the threshold value TH set in S2101 (S2102). It is the same processing as the S1202 described above.

When the acceleration Ap is equal to or greater than the threshold value TH (Yes in S2102), the second setting unit 924 sets the target current It (S2103). It is the processing in which the second setting unit 924 acquires the acceleration Ap calculated by the Ap calculation unit 113, and sets the target current It to the value calculated by using the acquired acceleration Ap and the control map illustrated in FIG. 16, for example.

Meanwhile, when the acceleration Ap is less than the threshold value TH (No in S2102), the first setting unit 121 sets the target current It (S2104). It is the same processing as the S1204 described above.

By controlling the damping force of the damping device 200 as such, the control device 900 can accurately suppress the suspension in the most extended state. As a result, it is possible to increase the degree of freedom in setting the damping force of the suspension with high accuracy.

Here, as in the second setting unit 724 of the control device 700, the second setting unit 924 of the control device 900 may increase the damping force as the acceleration Ap is increased. Thereby, according to the control device 900, it is possible to suppress the deterioration of the ride comfort caused by performing the control for suppressing the most extended state. As a result, it is possible to increase the degree of freedom in setting the damping force of the suspension with high accuracy.

As described above, the suspension device 820 includes a suspension including a damping device 200 which damps the force generated between the vehicle body 10 and the wheels, and a second setting unit 924 as an example of the damping force control unit that, when the acceleration Ap of the suspension in the extension direction is equal to or greater than a threshold value TH as an example of the predetermined value determined in advance, increases the damping force of the damping device 200 to be greater than when the acceleration Ap is less than a threshold value TH. Then, the second setting unit 924 may increase the target current It as the acceleration Ap is increased. That is, the second setting unit 924 may increase the damping force as the acceleration Ap is increased. As a result, according to the suspension device 820, it is possible to suppress with high accuracy the suspension in the most extended state. As a result, it is possible to increase the degree of freedom in setting the damping force of the suspension with high accuracy. By reducing the damping force when the acceleration Ap is small, the suspension device 820 suppresses the deterioration of the ride comfort due to the control for suppressing the most extended state.

The suspension device 820 includes a suspension including a damping device 200 which damps the force generated between the vehicle body 10 and the wheels, and a first setting unit 121 as an example of the first control unit that controls the damping force using the speed Vp in the extension direction of the suspension. The suspension device 820 includes a determination unit 523 that determines whether the suspension goes into the most extended state, from the first damping force according to the control of the first setting unit 121 (the damping force according to the target current It set by the first setting unit 121). The suspension device 820 includes the second setting unit 924 as an example of the second control unit that controls the damping force to be greater than the first damping force when the determination unit 523 determines that the suspension goes into the most extended state. Then, the second setting unit 924 may increase the target current It as the acceleration Ap is increased. That is, the second setting unit 924 may increase the damping force as the acceleration Ap is increased. As a result, according to the suspension device 820, it is possible to suppress with high accuracy the suspension in the most extended state. As a result, it is possible to increase the degree of freedom in setting the damping force of the suspension with high accuracy. By reducing the damping force when the acceleration Ap is small, the suspension device 820 suppresses the deterioration of the ride comfort due to the control for suppressing the most extended state.

Figure 22:
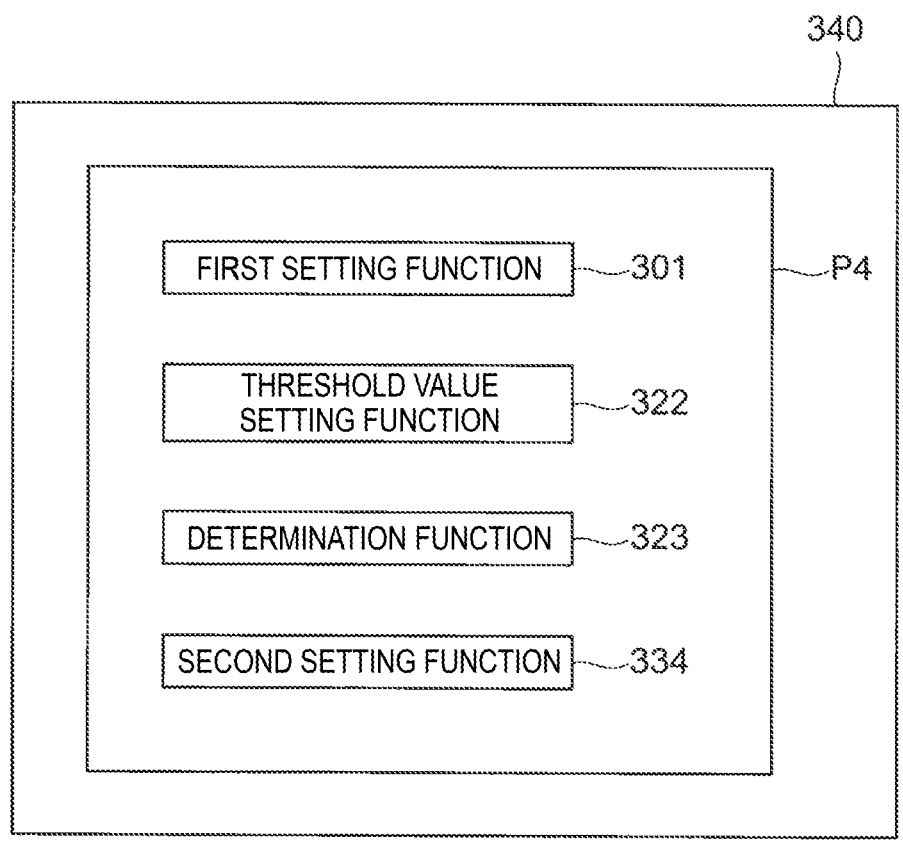
FIG. 22 is a diagram illustrating a schematic configuration of a recording medium 340.

FIG. 22 is a diagram illustrating a schematic configuration of a recording medium 340. The recording medium 340 is a non-transitory computer readable recording medium storing a program P4 that causes a computer to implement the function of controlling the damping force of the damping device 200.

As illustrated in FIG. 22, the recording medium 340 stores a program P4. The program P4 has a first setting function 301, a threshold setting function 322, a determination function 323, and a second setting function 334.

As described above, the recording medium 340 is a non-transitory computer readable recording medium which records a program P4 that causes a computer to implement the function of controlling the damping force of the damping device 200. When the acceleration Ap of the suspension including the damping device 200 in the extension direction is equal to or greater than the threshold value TH as an example of the predetermined value determined in advance, the recorded program P4 causes the computer to implement the second setting function 334 as an example of the function of increasing the damping force of the damping device 200 to be greater than when the acceleration Ap is less than the threshold value TH. The recorded program P4 causes the computer to implement the threshold setting function 322 of setting the threshold value TH so that the threshold value TH is decreased as the stroke amount Rp is decreased. In the recorded program P4, the second setting function 334 may increase the damping force as the acceleration Ap is increased.

The recorded program P4 implements, on a computer, a first setting function 301 as an example of the first control function of, in the extension direction of the suspension including the damping device 200, controlling the damping force of the damping device 200 using the speed Vp. The recorded program P4 implements, on the computer, a determination function 323 as an example of the function of determining whether the suspension goes into the most extended state under the first damping force according to the control of the first setting function 301. When determining that the suspension goes into the most extended state, the recorded program P4 implements, on the computer, a second setting function as an example of the second control function 334 of controlling the damping force to be greater than the first damping force.

In the present example, the determination function 323 may determine that the suspension goes into the most extended state when the acceleration Ap is equal to or greater than the threshold value TH. Then, the recorded program P4 causes the computer to implement the threshold setting function 322 of setting the threshold value TH so that the threshold value TH is decreased as the stroke amount Rp is decreased. In the recorded program P4, the second setting function 334 may increase the damping force as the acceleration Ap is increased.

The invention claimed is:

1. A suspension device comprising:
   a suspension including a damping device which damps a force generated between a vehicle body and a wheel of a motorcycle;
   a damping force control unit that increases a damping force of the damping device such that the damping force generated when an acceleration of a change in a stroke amount is equal to or greater than a predetermined value determined in advance becomes greater than the damping force generated when the acceleration of the change in the stroke amount is less than the predetermined value, the stroke amount being an amount of displacement from a reference position of the wheel with respect to the vehicle body in an extension direction of the suspension; and
   a predetermined value setting unit that sets the predetermined value such that the predetermined value is decreased as the stroke amount is decreased, wherein
   the damping force is increased in such a manner that the suspension does not go into the most extended state.

2. The suspension device according to claim 1, wherein the damping force control unit increases the damping force as the acceleration is increased.

3. A suspension device comprising:
   a suspension including a damping device which damps force generated between a vehicle body and a wheel of a motorcycle;
   a first control unit that controls a damping force of the damping device using a speed of change in a stroke amount, the stroke amount being an amount of displacement from a reference position of the wheel with respect to the vehicle body in an extension direction of the suspension;
   a determination unit that determines whether the suspension goes into the most extended state under a first damping force controlled by the first control unit; and
   a second control unit that controls the damping force so as to be greater than the first damping force when the determination unit determines that the suspension goes into the most extended state, wherein
   the damping force is increased by the second control unit in such a manner that the suspension does not go into the most extended state.

4. The suspension device according to claim 3, wherein when the acceleration of the change in the stroke amount is equal to or greater than a predetermined value determined in advance, the determination unit determines whether the suspension goes into the most extended state.

5. The suspension device according to claim 4, further comprising:
   a predetermined value setting unit that sets the predetermined value such that the predetermined value is decreased as the stroke amount is decreased.

6. The suspension device according to claim 3, wherein the second control unit increases the damping force as the acceleration of the change in the stroke amount is increased.

7. The suspension device according to claim 4, wherein the second control unit increases the damping force as the acceleration of the change in the stroke amount is increased.

8. The suspension device according to claim 5, wherein the second control unit increases the damping force as the acceleration of the change in the stroke amount is increased.

\* \* \* \* \*